US012665355B2

(12) United States Patent
Zhao et al.

(10) Patent No.: US 12,665,355 B2
(45) Date of Patent: Jun. 23, 2026

(54) ELECTRICAL CONNECTOR ASSEMBLY WITH METAL HOUSING. AND MANUFACTURING METHOD, AND ELECTRONIC DEVICE THEREOF

(71) Applicant: HUAWEI TECHNOLOGIES CO., LTD., Shenzhen (CN)

(72) Inventors: Zhigang Zhao, Dongguan (CN); Beijun Li, Shenzhen (CN); Wang Xiong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 578 days.

(21) Appl. No.: 18/186,318

(22) Filed: Mar. 20, 2023

(65) Prior Publication Data

US 2023/0231344 A1 Jul. 20, 2023

Related U.S. Application Data

(63) Continuation of application No. PCT/CN2021/106461, filed on Jul. 15, 2021.

(30) Foreign Application Priority Data

Sep. 21, 2020 (CN) ......................... 202010997525.2

(51) Int. Cl.
*H01R 13/6594* (2011.01)
*H01R 13/6581* (2011.01)
(Continued)

(52) U.S. Cl.
CPC ..... *H01R 13/6594* (2013.01); *H01R 13/6581* (2013.01); *H01R 13/6587* (2013.01);
(Continued)

(58) Field of Classification Search
CPC ............ H01R 13/6594; H01R 13/6581; H01R 13/6587; H01R 13/65917; H01R 13/6592;
(Continued)

(56) References Cited

U.S. PATENT DOCUMENTS 7,275,960 B2 10/2007 Fukushima et al.
10,069,249 B2 9/2018 Dai
(Continued)

FOREIGN PATENT DOCUMENTS

CN 204558803 U 8/2015
CN 205543504 U 8/2016
(Continued)

OTHER PUBLICATIONS

Office Action for Chinese Application No. 202010997525.2 dated Jul. 18, 2022, 9 pages.
(Continued)

*Primary Examiner* — Justin M Kratt

(57) ABSTRACT

The technology of this application relates to a connector assembly including a metal housing, a conducting piece, a wire, and a shield layer. The metal housing includes a shield cavity. The conducting piece is accommodated in the shield cavity. The wire is partially located in the shield cavity and is electrically connected to one end of the conducting piece. The shield layer is wrapped around the wire. At least two electrical connecting parts are disposed on an outer surface of the shield layer. The at least two electrical connecting parts face different directions and are respectively electrically connected to parts, of the metal housing, that the at least two electrical connecting parts face, to reduce impact of crosstalk of the connector assembly.

20 Claims, 13 Drawing Sheets

(51) Int. Cl.

| | |
|---|---|
| ***H01R 13/6587*** | (2011.01) |
| ***H01R 13/6591*** | (2011.01) |
| ***H01R 13/6592*** | (2011.01) |
| ***H01R 13/6596*** | (2011.01) |
| ***H01R 43/20*** | (2006.01) |
| *H01R 13/6461* | (2011.01) |
| *H01R 13/6585* | (2011.01) |
| *H01R 13/6586* | (2011.01) |
| *H01R 13/6593* | (2011.01) |

(52) U.S. Cl.

CPC . *H01R 13/65915* (2020.08); *H01R 13/65917* (2020.08); *H01R 13/6592* (2013.01); *H01R 13/6596* (2013.01); *H01R 43/20* (2013.01); *H01R 13/6461* (2013.01); *H01R 13/6585* (2013.01); *H01R 13/6586* (2013.01); *H01R 13/6591* (2013.01); *H01R 13/65912* (2020.08); *H01R 13/65914* (2020.08); *H01R 13/65918* (2020.08); *H01R 13/6593* (2013.01); *H01R 43/205* (2013.01)

(58) Field of Classification Search

CPC ................ H01R 13/6596; H01R 43/20; H01R 13/6461; H01R 13/6585; H01R 13/6586; H01R 13/6591; H01R 13/65912; H01R 13/65914; H01R 13/65915; H01R 13/65918; H01R 13/6593; H01R 43/205

See application file for complete search history.

(56) References Cited

U.S. PATENT DOCUMENTS

| | | | | |
|---|---|---|---|---|
| 10,699,823 | B2 * | 6/2020 | Blackburn ............... | H04B 3/30 |
| 2014/0220822 | A1 | 8/2014 | Keyser et al. | |
| 2017/0040746 | A1 | 2/2017 | Zhang et al. | |
| 2020/0005966 | A1 | 1/2020 | Blackburn | |

FOREIGN PATENT DOCUMENTS

| | | | |
|---|---|---|---|
| CN | 106463858 | A | 2/2017 |
| CN | 109038115 | A | 12/2018 |
| CN | 109891676 | A | 6/2019 |
| JP | 2002100444 | A | 4/2002 |
| JP | 2005522848 | A | 7/2005 |

OTHER PUBLICATIONS

Office Action for Japanese Application No. 2023-518086 dated Jun. 17, 2024 (with translation), 7 pages.

European Search Report for EP Application No. 21868251.6 dated Jan. 29, 2024, 8 pages.

Notice of Preliminary Rejection for Application No. 9-5-2024-063427363 dated Jul. 29, 2024, 6 pages.

Office Action for Japanese Application No. 2023-518086 dated Jun. 17, 2024, 7 pages.

* cited by examiner

ELECTRICAL CONNECTOR ASSEMBLY WITH METAL HOUSING. AND MANUFACTURING METHOD, AND ELECTRONIC DEVICE THEREOF

CROSS-REFERENCE TO RELATED APPLICATION

This application is a continuation of International Application No. PCT/CN2021/106461, filed on Jul. 15, 2021, which claims priority to Chinese Patent Application No. 202010997525.2, filed on Sep. 21, 2020. The disclosures of the aforementioned applications are hereby incorporated by reference in their entireties.

TECHNICAL FIELD

This application relates to the field of electronic technologies, and in particular, to a connector assembly and a manufacturing method thereof, and an electronic device.

BACKGROUND

In a communication device system, a backplane and a subboard that are combined are usually connected through printed circuit board (PCB) wiring. However, as a rate of a communication device evolves to 56 Gbps and 112 Gbps, a loss caused by conventional PCB wiring is also facing a great challenge, and can hardly meet a requirement of a system for a passive link. Compared with the PCB wiring, a connector assembly has significant improvement in terms of a loss. Replacing the PCB wiring with the connector assembly becomes one of main technical directions to reduce a loss. However, currently, a crosstalk indicator of a connector assembly in the industry cannot meet an application requirement of 112 Gbps.

SUMMARY

Embodiments of this application provide a connector assembly, a manufacturing method for a connector assembly, and an electronic device including the connector assembly, to reduce impact of crosstalk of a connector assembly, and provide a connector assembly and an electronic device that meet an application requirement of 112 Gbps.

According to a first aspect, a connector assembly is provided. The connector assembly includes a metal housing, a conducting piece, a wire, and a shield layer. The metal housing includes a shield cavity. The conducting piece is accommodated in the shield cavity. The wire is partially located in the shield cavity and is electrically connected to one end of the conducting piece. The shield layer is wrapped around the wire. At least two electrical connecting parts are disposed on an outer surface of the shield layer. The at least two electrical connecting parts face different directions and are respectively electrically connected to parts, of the metal housing, that the at least two electrical connecting parts face, to reduce impact of crosstalk of the connector assembly.

In this application, the conducting piece is accommodated in the shield cavity, the wire is partially located in the shield cavity and is electrically connected to one end of the conducting piece, and the at least two electrical connecting parts on the shield layer wrapped around the wire face different directions and are respectively electrically connected to the parts, of the metal housing, that the at least two electrical connecting parts face. That is, the at least two electrical connecting parts on the shield layer that face different directions are respectively electrically connected to peripheral walls, of the shield cavity, that the at least two electrical connecting parts face. Therefore, when a signal returns from a peripheral wall of the shield cavity to the wire, the signal on the peripheral wall of the shield cavity is transmitted to an electrical connecting part, on the shield layer, that is close to the peripheral wall. Compared with a case in which the peripheral wall of the shield cavity is electrically connected only to one electrical connecting part on the shield layer, a signal return path is shorter, and a loop inductance is small, thereby effectively reducing impact of crosstalk of the connector assembly, and supporting signal transmission at 112 Gbps and a higher rate.

In some embodiments, the shield layer includes a first surface, a second surface, a third surface, and a fourth surface that face different directions and that are sequentially connected, the at least two electrical connecting parts include a first electrical connecting part and a second electrical connecting part, the first electrical connecting part extends from the first surface to the third surface, and the second electrical connecting part is located on the fourth surface.

It may be understood that the first electrical connecting part and the second electrical connecting part are jointly distributed on an entire peripheral surface of the shield layer, so that the entire peripheral surface of the shield layer can be electrically connected to the peripheral wall of the shield cavity. That is, the four surfaces of the shield layer are respectively electrically connected to four peripheral walls of the shield cavity that correspond to the four surfaces. Therefore, when signals return from the four peripheral walls of the shield cavity to the wire, the signals on the four peripheral walls of the shield cavity are respectively transmitted to the four surfaces of the shield layer that are close to the four peripheral walls. Compared with a case in which only one of the four peripheral walls of the shield cavity is electrically connected to a surface of the shield layer, a signal return path is shorter, and a loop inductance is small, thereby effectively reducing impact of crosstalk of the connector assembly, and supporting signal transmission at 112 Gbps and a higher rate.

In some embodiments, the metal housing includes a first housing and a second housing, the second housing is buckled to the first housing to form the shield cavity, and the at least two electrical connecting parts are respectively electrically connected to the first housing and the second housing that the at least two electrical connecting parts face. The first housing and the second housing form one or more shield cavities. The shield cavity is formed by the first housing and the second housing, thereby facilitating assembly of the connector assembly.

In some embodiments, there are at least two shield cavities, the at least two shield cavities form at least two rows of shield cavities, the at least two rows of shield cavities include a first row of shield cavities and a second row of shield cavities, the metal housing includes a first housing, a second housing, and a metal sheet, the metal sheet is located between the first housing and the second housing, the metal sheet and the first housing form the first row of shield cavities, the metal sheet and the second housing form the second row of shield cavities, each conducting piece and each wire correspond to one shield cavity, at least two electrical connecting parts located in the first row of shield cavities each are electrically connected to the first housing and the metal sheet that the at least two electrical connecting parts face, and at least two electrical connecting parts located in the second row of shield cavities each are electrically connected to the second housing and the metal sheet that the at least two electrical connecting parts face.

In this embodiment, a quantity of conducting pieces and a quantity of wires are the same as a quantity of shield cavities, and each conducting piece and a part of a wire connected to the conducting piece are disposed in a separate shield cavity, to separately shield each conducting piece and a wire connected to the conducting piece. This effectively reduces impact of crosstalk between different conducting pieces and wires connected to the conducting pieces, thereby effectively reducing impact of crosstalk of the connector assembly, and supporting signal transmission at 112 Gbps and a higher rate.

In some embodiments, the metal sheet includes a first metal sheet and a second metal sheet, the first metal sheet is connected to the first housing, the second metal sheet is disposed on a side, of the first metal sheet, that backs the first housing, and is connected to the second housing, the first row of shield cavities is formed between the first metal sheet and the first housing, the second row of shield cavities is formed between the second metal sheet and the second housing, the at least two electrical connecting parts located in the first row of shield cavities each are electrically connected to the first housing and the first metal sheet that the at least two electrical connecting parts face, and the at least two electrical connecting parts located in the second row of shield cavities each are electrically connected to the second housing and the second metal sheet that the at least two electrical connecting parts face.

In this embodiment, there are two metal sheets, and the two metal sheets form the first row of shield cavities and the second row of shield cavities with the first housing and the second housing respectively, so that the two metal sheets (the first metal sheet and the second metal sheet) can be arranged in a staggered manner, thereby facilitating staggered arrangement of the two metal sheets (the first metal sheet and the second metal sheet), and further facilitating staggered arrangement of two rows of conducting pieces. In this embodiment, the first housing, the second housing, the first metal sheet, and the second metal sheet are fastened through connection, thereby facilitating assembly of the connector assembly.

In some embodiments, the first housing includes a groove and a plurality of partition walls, the plurality of partition walls are disposed in the groove at spacings to form a plurality of first shield grooves, and the first metal sheet covers an opening of the first shield groove to form the first row of shield cavities. That is, a cavity wall of the first row of shield cavities is formed by connecting the first metal sheet, the partition walls, and a groove wall of the groove. A first body and the plurality of partition walls are integrated, thereby ensuring a connection structure between the first body and the partition walls.

In some embodiments, a part, of the wire, that is located in the shield cavity is embedded in the first shield groove, so that an electrical connecting part, on the shield layer, that faces a groove wall of the first shield groove is attached to the groove wall. All electrical connecting parts, on the shield layer, that face the groove wall of the first shield groove are electrically connected to the groove wall of the first shield groove. Therefore, when a signal returns from the groove wall of the first shield groove to the electrical connecting parts, on the shield layer of the wire, that face the first shield groove, the signal on the groove wall of the first shield groove is transmitted to an electrical connecting part, on the shield layer, that is close to the groove wall. A signal return path is shorter, and a loop inductance is small, thereby effectively reducing impact of crosstalk of the connector assembly, and supporting signal transmission at 112 Gbps and a higher rate.

In some embodiments, a shape of the electrical connecting part, on the shield layer, that faces the groove wall is the same as a shape of the groove wall, so that the electrical connecting part, on the shield layer, that faces the groove wall of the first shield groove is closely attached to the groove wall of the first shield groove. In this way, a good electrical connection is implemented between electrical connecting parts on three surfaces of the shield layer and the groove wall of the first shield groove, thereby effectively reducing crosstalk of the connector assembly.

In some embodiments, a conducting part is disposed on a surface, of the first metal sheet, that faces the first shield groove, and the conducting part abuts against an electrical connecting part, on the shield layer, that backs the first shield groove. In this embodiment, the conducting part is an elastomer. Because the elastomer is elastic, the first metal sheet can be electrically connected to the wire, and the wire can abut against the groove wall of the first shield groove, thereby ensuring a good electrical connection between the shield layer of the wire and the groove wall of the first shield groove, and effectively reducing crosstalk of the connector assembly. Certainly, the conducting part may alternatively be a convex structure such as a convex hull.

In some embodiments, the connector assembly further includes a limiting block, the limiting block is disposed in the first shield groove, and an end of a contact part is embedded in a surface of the limiting block to limit the contact part. Specifically, the limiting block is made of an insulation material, and an end, of the conducting piece, that is away from the wire may be partially embedded in a surface, of the limiting block, that backs the first shield groove, or may be disposed on the surface, of the limiting block, that backs the first shield groove. The limiting block limits the conducting piece, to avoid deformation of the conducting piece during use. In addition, the limiting block can further prevent the conducting piece from being electrically connected to the groove wall of the first shield groove, thereby improving service life of the connector assembly and improving safety performance of the connector assembly.

In some embodiments, the second housing includes a plurality of partition plates, the plurality of partition plates are disposed at spacings on a surface, of the second housing, that faces the first housing, and form a plurality of second shield grooves with the surface, of the second housing, that faces the first housing, and the second metal sheet covers an opening of the second shield groove to form the second row of shield cavities.

In some embodiments, the conducting piece includes a contact part and a connecting part that are connected to each other, the connecting part is electrically connected to the wire, and the contact part is exposed from a surface, of the second housing, that backs the first housing. The contact part is exposed from the surface of the second housing, to be connected to another related device.

In some embodiments, the connector assembly further includes an insulator, and the insulator is wrapped around a location at which the connecting part is close to the contact part. The insulator is wrapped around the conducting piece to fasten two conducting terminals of the conducting piece. In addition, the insulator can further isolate the conducting piece from the first shield groove, or isolate the conducting piece from a cavity wall of the second row of shield cavities, to prevent an electrical connection between the conducting piece and the groove wall of the first shield groove or the cavity wall of the second row of shield cavities.

In some embodiments, the connector assembly further includes a fastener, and the fastener is wrapped around a junction between the connecting part and the wire, and fastens a wire disposed in a same row of shield cavities. The fastener can protect a solder joint between the conducting piece and the wire. In addition, a plurality of conducting pieces and a plurality of wires that are located in a same row can be fastened by using the fastener to form a transmission plate, so as to quickly assemble the connector assembly. This effectively improves production efficiency of the connector assembly, and reduces production costs of the connector assembly.

According to a second aspect, an electronic device is provided. The electronic device includes a circuit board and the foregoing connector assembly. The connector assembly is connected between the circuit board and another device, or the connector assembly is connected between two elements of the circuit board. In the electronic device with the connector assembly provided in this application, a loss and crosstalk of the connector assembly are effectively reduced, and signal transmission at 112 Gbps and a higher rate is supported.

According to a third aspect, a manufacturing method for a connector assembly is provided. The manufacturing method includes:

- electrically connecting a conducting piece to a wire to form a transmission piece, where a shield layer is wrapped around the wire, at least two electrical connecting parts are disposed on an outer surface of the shield layer, and the at least two electrical connecting parts face different directions; and
- providing a metal housing, and mounting the transmission piece in a shield cavity of the metal housing, where the at least two electrical connecting parts are respectively electrically connected to parts, of the metal housing, that the at least two electrical connecting parts face.

In this application, the transmission piece is first formed, and then the transmission piece is mounted in the shield cavity of the metal housing, where the at least two electrical connecting parts are respectively electrically connected to the parts, of the metal housing, that the at least two electrical connecting parts face. That is, the at least two electrical connecting parts on the shield layer that face different directions are respectively electrically connected to peripheral walls, of the shield cavity, that the at least two electrical connecting parts face. Therefore, when a signal returns from a peripheral wall of the shield cavity to the wire, the signal on the peripheral wall of the shield cavity is transmitted to an electrical connecting part, on the shield layer, that is close to the peripheral wall. Compared with a case in which the peripheral wall of the shield cavity is electrically connected only to one electrical connecting part on the shield layer, a signal return path is shorter, and a loop inductance is small, thereby effectively reducing impact of crosstalk of the connector assembly, and supporting signal transmission at 112 Gbps and a higher rate.

In some embodiments, the providing a metal housing includes: forming a first housing and a second housing; and the mounting the transmission piece in a shield cavity of the metal housing includes: disposing the transmission piece on the first housing, and buckling the second housing to the first housing, so that the transmission piece is mounted in the shield cavity formed by the first housing and the second housing. The first housing and the second housing form one or more shield cavities, and the at least two electrical connecting parts are respectively electrically connected to the first housing and the second housing that the at least two electrical connecting parts face. The shield cavity is formed by the first housing and the second housing, thereby facilitating assembly of the connector assembly.

In some embodiments, the manufacturing method further includes: disposing a plurality of transmission pieces in a row to form a first transmission plate and a second transmission plate; the providing a metal housing includes: forming a first housing and a second housing, providing a metal sheet, where the metal sheet includes a first metal sheet and a second metal sheet, mounting the first metal sheet on the first transmission plate, and mounting the second metal sheet on the second transmission plate; and the mounting the transmission piece in a shield cavity of the metal housing includes: making the first transmission plate on which the first metal sheet is mounted face the first housing, and then mounting the second transmission plate on which the second metal sheet is mounted on a side, of the first metal sheet, that backs the first housing, and finally, mounting the second housing on the first housing, so that a transmission piece of the first transmission plate is disposed in a shield cavity formed by the first housing and the first metal sheet, a transmission piece of the second transmission plate is disposed in a shield cavity formed by the second housing and the second metal sheet, at least two electrical connecting parts located in a first row of shield cavities each are electrically connected to the first housing and the first metal sheet that the at least two electrical connecting parts face, and at least two electrical connecting parts located in a second row of shield cavities each are electrically connected to the second housing and the second metal sheet that the at least two electrical connecting parts face.

In this embodiment, first, the first metal sheet is mounted on the first transmission plate, and the second metal sheet is mounted on the second transmission plate; and then the first metal sheet and the first transmission plate are mounted on the first housing, and the second metal sheet and the second transmission plate are mounted on the first housing. That is, in this embodiment, different elements of the connector assembly are modularized and then assembled, thereby effectively improving assembly efficiency of the connector assembly, improving production efficiency of the connector assembly, and reducing production costs.

BRIEF DESCRIPTION OF DRAWINGS

To describe technical solutions in embodiments of this application or in the background more clearly, the following describes accompanying drawings used in embodiments of this application or in the background.

DESCRIPTION OF EMBODIMENTS

The following describes embodiments of this application with reference to accompanying drawings in embodiments of this application.

Figure 1:
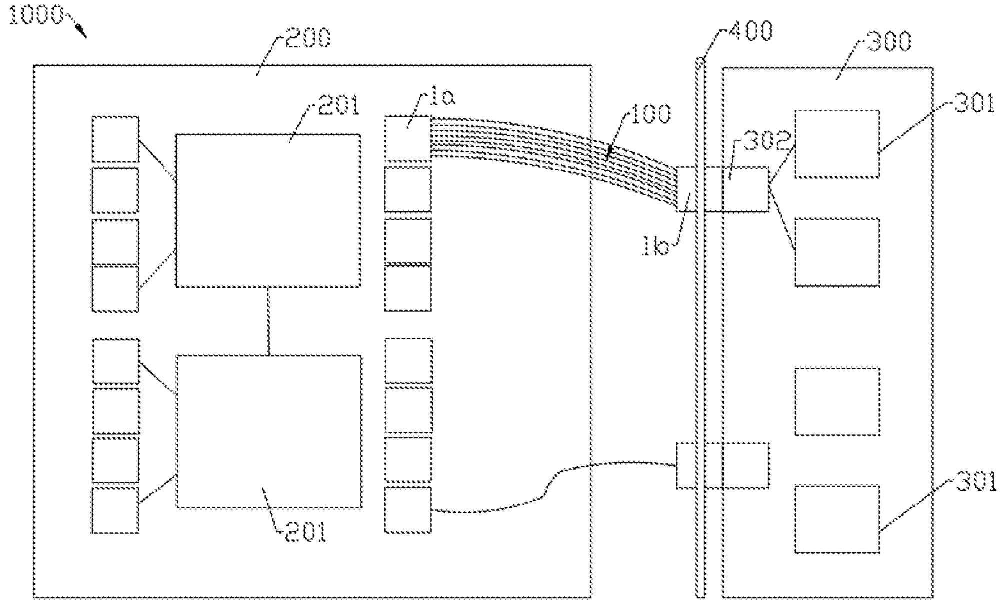
FIG. 1 is an example schematic diagram of a structure of an electronic device according to an embodiment of this application.

FIG. 1 is a schematic diagram of a structure of an electronic device 1000 according to an embodiment of this application.

An embodiment of this application provides an electronic device 1000. The electronic device 1000 includes but is not limited to an electronic device 1000 with a connector assembly, for example, a large communication device, an ultra-high-performance server, a supercomputer, an industrial computer, or a high-end storage device. In this application, an example in which the electronic device 1000 is a communication device is used for specific description.

The electronic device 1000 includes a connector assembly 100 and a circuit board. The circuit board includes a first circuit board 200 and a second circuit board 300. In this embodiment, the connector assembly 100 is connected between the first circuit board 200 and the second circuit board 300. The first circuit board 200 may be a primary circuit board. The primary circuit board is also referred to as a host board, a system board, a logic board, a motherboard, or the like, and is a primary circuit board that constitutes a complex electronic system, for example, a communication device. The second circuit board 300 may be a secondary circuit board, and the secondary circuit board is a circuit board other than the primary circuit board in the electronic device 1000. A function of the connector assembly 100 is to build a bridge for communication between the first circuit board 200 and the second circuit board 300, so that a current flows to implement a predetermined function of a circuit. In the electronic device 1000 with the connector assembly 100 provided in this application, a loss and crosstalk of the connector assembly 100 are effectively reduced, and signal transmission at 112 Gbps and a higher rate is supported.

Certainly, in a scenario of another embodiment, both the first circuit board and the second circuit board may alternatively be secondary circuit boards, and the connector assembly may be connected between the two secondary circuit boards. In another scenario of another embodiment, the connector assembly may alternatively be connected between two elements of the first circuit board, or the connector assembly may be connected between two elements of the second circuit board.

In this embodiment, the first circuit board 200 is integrated with a plug-in terminal and various chips 201, for example, chips such as a central processing chip and a system chip. The second circuit board 300 is also integrated with a chip 301 and a plug-in terminal 302, and the connector assembly 100 is connected between the plug-in terminal of the first circuit board 200 and the plug-in terminal 302 of the second circuit board 300, to implement a circuit connection between the first circuit board 200 and the second circuit board 300. The first circuit board 200 shown in FIG. 1 is electrically connected only to one second circuit board 300 through the connector assembly 100. Certainly, the first circuit board 200 may alternatively be electrically connected to a plurality of second circuit boards through a plurality of connector assemblies respectively. Parts, of the plurality of connector assemblies, that are connected to the second circuit boards 300 may be fastened by using a support fastener 400.

It may be understood that the structure shown in this embodiment of this application does not constitute a specific limitation on the electronic device 1000. In some other embodiments of this application, the electronic device 1000 may include more or fewer components than those shown in the figure, or some components may be combined, or some components may be split, or there may be a different component layout.

Figure 2:
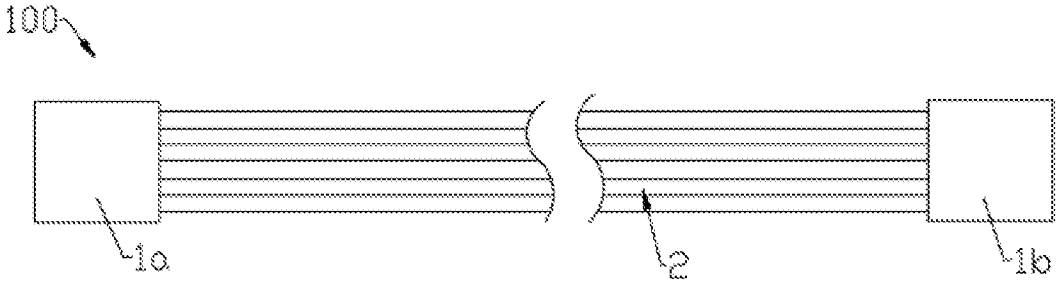
FIG. 2 is an example schematic diagram of a structure of a connector assembly of the electronic device shown in FIG. 1.

Further, refer to FIG. 2. FIG. 2 is a schematic diagram of a structure of the connector assembly 100 of the electronic device 1000 shown in FIG. 1.

The connector assembly 100 includes a connector 1*a*, a connector 1*b*, a wire 2, and a shield layer. The shield layer is wrapped around the wire 2. Two ends of the wire 2 are respectively electrically connected to the connector 1*a* and the connector 1*b*. The connector 1*a* is electrically connected to the plug-in terminal of the first circuit board 200, and the connector 1*b* is electrically connected to the plug-in terminal 302 of the second circuit board 300, so that the first circuit board 200 is connected to the second circuit board 300 through the connector assembly 100. In this embodiment, structures of the connector 1*a* and the connector 1*b* may be approximately the same. The following describes the connectors by using the connector 1*a* as an example. Certainly, in another implementation, structures of the connector 1*a* and the connector 1*b* may alternatively be different.

Figure 3:
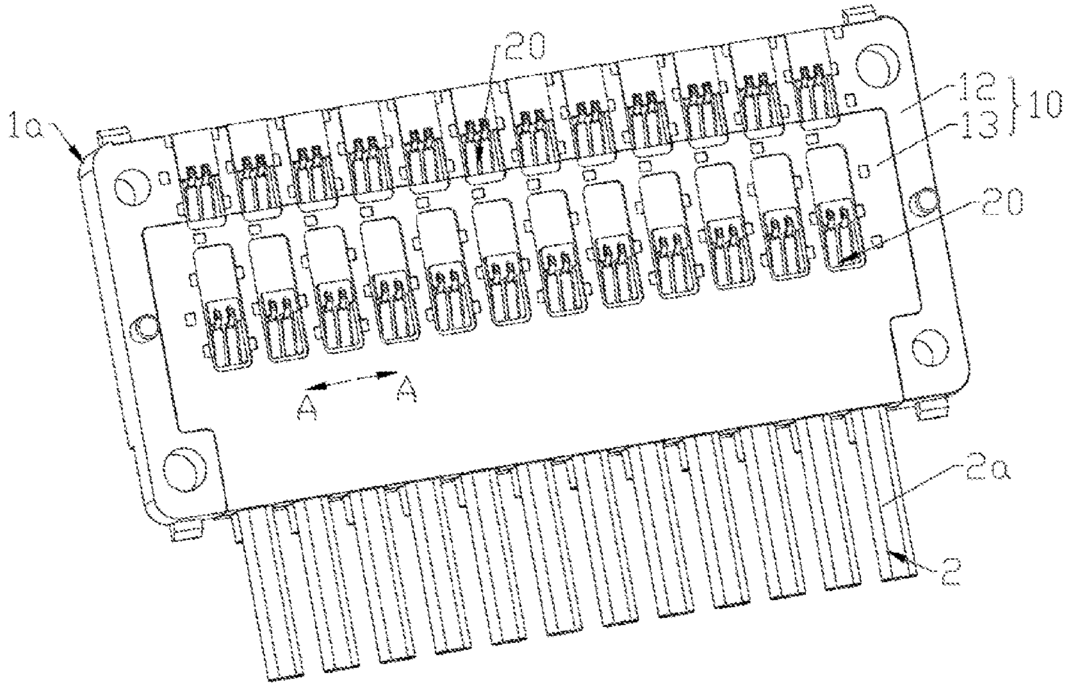
FIG. 3 is an example schematic diagram of a partial structure of the connector assembly shown in FIG. 2.
Figure 4:
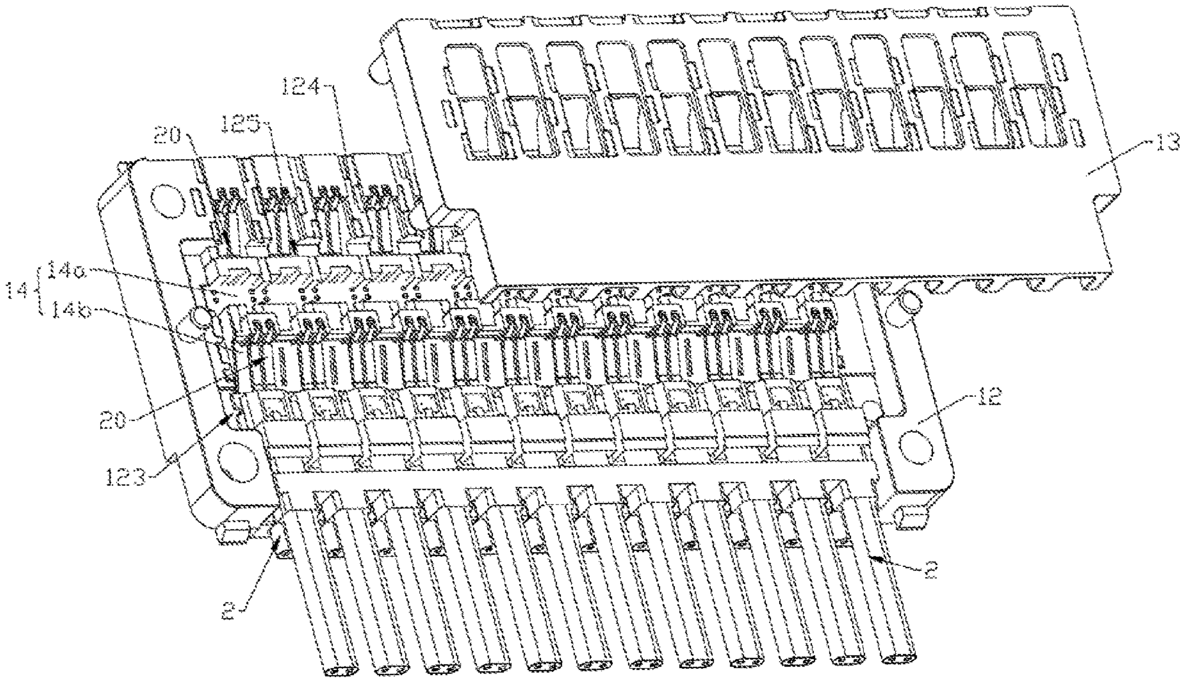
FIG. 4 is an example schematic exploded view of a structure of the connector assembly shown in FIG. 3.
Figure 5:
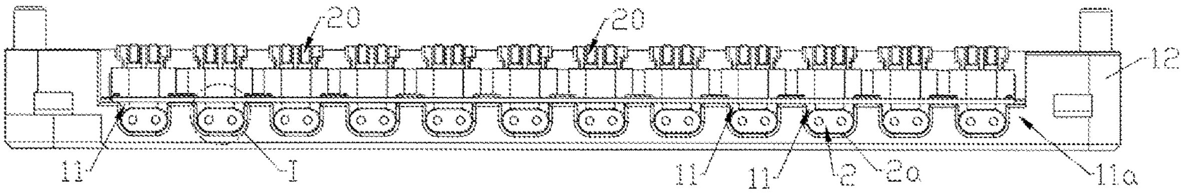
FIG. 5 is an example partial cross-sectional view of the connector assembly shown in FIG. 4.

Refer to FIG. 3, FIG. 4, and FIG. 5. FIG. 3 is a schematic diagram of a partial structure of the connector assembly 100 shown in FIG. 2. FIG. 4 is a schematic exploded view of a structure of the connector assembly 100 shown in FIG. 3. FIG. 5 is a partial cross-sectional view of the connector assembly 100 shown in FIG. 4.

The connector 1*a* includes a metal housing 10 and a conducting piece 20. The metal housing 10 includes a shield cavity 11 (FIG. 5). The conducting piece 20 is accommodated in the shield cavity 11. The wire 2 is partially located in the shield cavity 11 and is electrically connected to one end of the conducting piece 20. At least two electrical connecting parts are disposed on an outer surface of the shield layer 2*a*. The at least two electrical connecting parts face different directions and are respectively electrically connected to parts, of the metal housing 10, that the at least two electrical connecting parts face, to reduce impact of crosstalk of the connector assembly.

In this embodiment, the at least two electrical connecting parts are disposed on the outer surface of the shield layer 2*a*, and the electrical connecting parts are parts, of the shield layer 2*a*, that are electrically connected to the metal housing 10. Electrical connecting parts facing different directions may be connected or separated. Certainly, in another embodiment, a conductor may alternatively be disposed on the outer surface of the shield layer 2*a* to form an electrical connecting part, so as to implement an electrical connection between the shield layer 2*a* and the metal housing 10. Alternatively, a plurality of electrical connecting parts facing different directions may be disposed on the outer surface of the shield layer 2*a*, and each electrical connecting part is electrically connected to a part, of the metal housing 10, that the electrical connecting part faces.

Figure 6A:
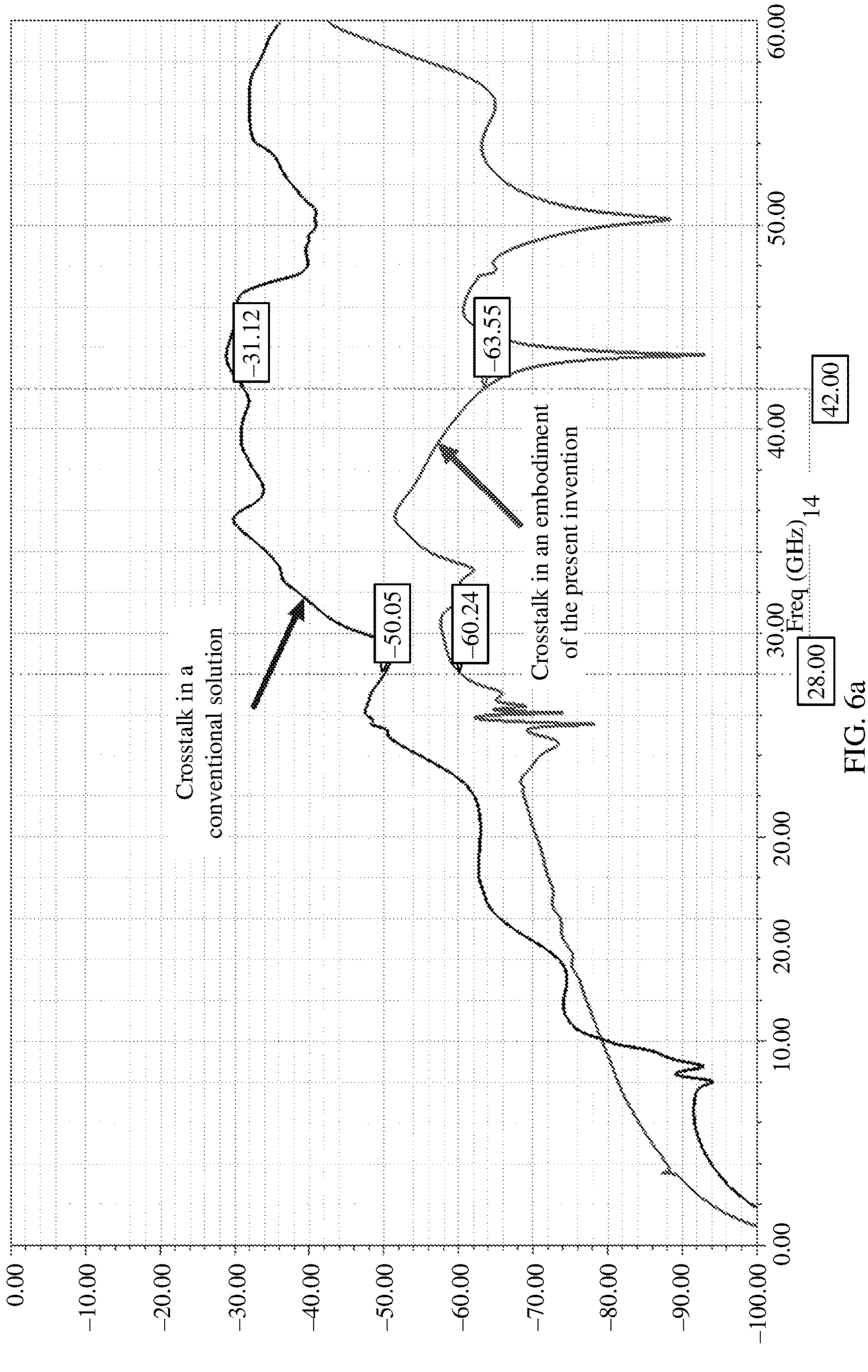
FIG. 6*a* is an example schematic diagram of comparison between crosstalk in an embodiment of the present disclosure and crosstalk in a conventional solution.

In this application, the conducting piece 20 is accommodated in the shield cavity 11, the wire 2 is partially located in the shield cavity 11 and is electrically connected to one end of the conducting piece 20, and the at least two electrical connecting parts on the shield layer 2*a* wrapped around the wire 2 face different directions and are respectively electrically connected to the parts, of the metal housing 10, that the at least two electrical connecting parts face. That is, the at least two electrical connecting parts on the shield layer 2*a* that face different directions are respectively electrically connected to peripheral walls, of the shield cavity 11, that the at least two electrical connecting parts face. Therefore, when a signal returns from a peripheral wall of the shield cavity 11 to the wire 2, the signal on the peripheral wall of the shield cavity 11 is transmitted to an electrical connecting part, on the shield layer 2*a*, that is close to the peripheral wall. Compared with a case in which the peripheral wall of the shield cavity 11 is electrically connected only to one electrical connecting part on the shield layer 2*a*, a signal return path is shorter, and a loop inductance is small, thereby effectively reducing impact of crosstalk of the connector assembly 100 (FIG. 6*a* is a schematic diagram of comparison between crosstalk in an embodiment of the present disclosure and crosstalk in a conventional solution), and supporting signal transmission at 112 Gbps and a higher rate.

Figure 6B:
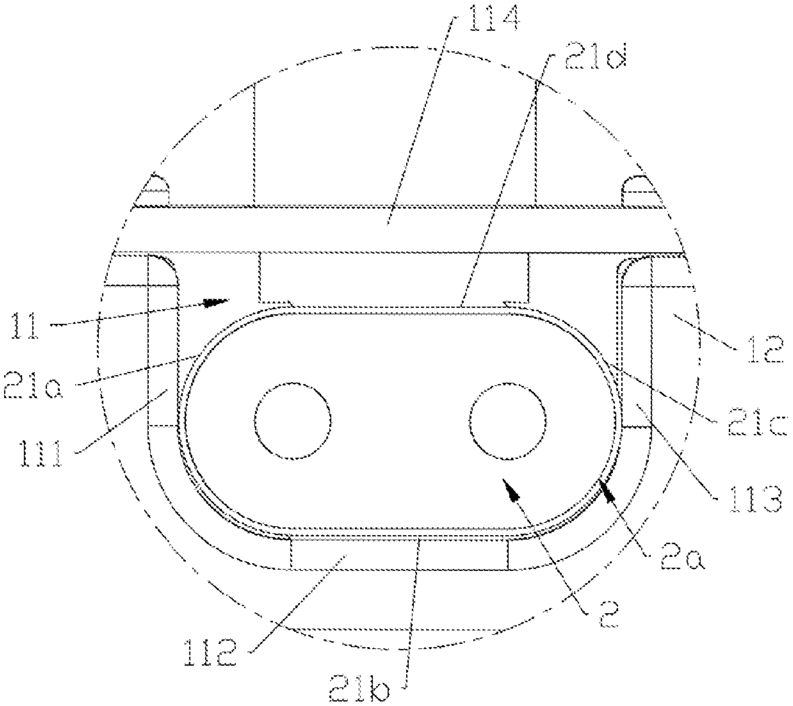
FIG. 6b is an example $I^{th}$ locally enlarged schematic diagram of the connector assembly shown in FIG. 5.

In this embodiment, as shown in FIG. 6*b*, the shield layer 2*a* includes a first surface 21*a*, a second surface 21*b*, a third surface 21*c*, and a fourth surface 21*d* that face different directions and that are sequentially connected. It may be understood that the first surface 21*a*, the second surface 21*b*, the third surface 21*c*, and the fourth surface 21*d* are arranged in a circle to form a peripheral surface of the shield layer 2*a*, the at least two electrical connecting parts include a first electrical connecting part and a second electrical connecting part, the first electrical connecting part extends from the first surface 21*a* to the third surface 21*c*, and the second electrical connecting part is located on the fourth surface 21*d*. A peripheral wall of the shield cavity 11 includes a first wall 111, a second wall 112, a third wall 113, and a fourth wall 114. The first surface 21*a* faces the first wall 111 and is electrically connected to the first wall 111. The second surface 21*b* faces the second wall 112 and is electrically connected to the second wall 112. The third surface 21*c* faces the third wall 113 and is electrically connected to the third wall 113. The fourth surface 21*d* faces the fourth wall 114 and is electrically connected to the fourth wall 114.

It may be understood that the first electrical connecting part and the second electrical connecting part are jointly distributed on the entire peripheral surface of the shield layer 2*a*, so that the entire peripheral surface of the shield layer 2*a* can be electrically connected to the peripheral wall of the shield cavity 11. That is, the four surfaces of the shield layer 2*a* are respectively electrically connected to four peripheral walls of the shield cavity 11 that correspond to the four surfaces. Therefore, when signals return from the four peripheral walls of the shield cavity 11 to the wire 2, the signals on the four peripheral walls of the shield cavity 11 are respectively transmitted to the four surfaces of the shield layer 2*a* that are close to the four peripheral walls. Compared with a case in which only one of the four peripheral walls of the shield cavity 11 is electrically connected to a surface of the shield layer 2*a*, a signal return path is shorter, and a loop inductance is small, thereby effectively reducing impact of crosstalk of the connector assembly 100, and supporting signal transmission at 112 Gbps and a higher rate. Certainly, in another embodiment, the peripheral surface of the shield layer 2*a* may alternatively be circular, and the at least two electrical connecting parts may be disposed around the peripheral surface of the shield layer 2*a* to form one electrical connecting part. Alternatively, a plurality of electrical connecting parts facing different directions are disposed in different directions of the peripheral surface of the shield layer 2*a*.

Figure 7:
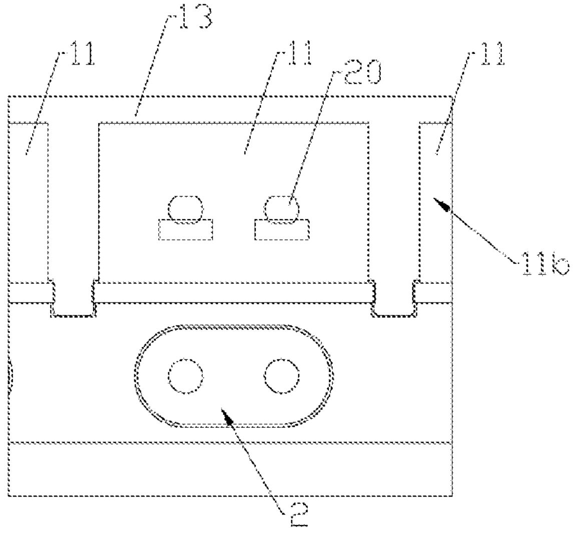
FIG. 7 is an example cross-sectional view of the connector assembly shown in FIG. 3 in an A-A direction.

Refer to FIG. 5 and FIG. 7. FIG. 7 is a cross-sectional view of the connector assembly 100 shown in FIG. 3 in an A-A direction.

In this embodiment, there are a plurality of shield cavities 11, the plurality of shield cavities 11 form two rows of shield cavities, and the two rows of shield cavities include a first row of shield cavities 11*a* and a second row of shield cavities 11*b*. Each conducting piece 20 and each wire 2 correspond to one shield cavity 11. That is, a quantity of conducting pieces 20 and a quantity of wires 2 are the same as a quantity of shield cavities 11. A plurality of conducting pieces 20 form two rows of conducting pieces. Each conducting piece 20 and a part of a wire 2 connected to the conducting piece are disposed in a separate shield cavity 11, to separately shield each conducting piece 20 and a wire 2 connected to the conducting piece. This effectively reduces impact of crosstalk between different conducting pieces 20 and wires 2 connected to the conducting pieces, thereby effectively reducing impact of crosstalk of the connector assembly, and supporting signal transmission at 112 Gbps and a higher rate.

Certainly, in a scenario of another embodiment, there are at least two shield cavities, the at least two shield cavities form at least two rows of shield cavities, and the at least two rows of shield cavities include a first row of shield cavities and a second row of shield cavities. In another scenario of another embodiment, there may alternatively be one or more shield cavities, and the one or more shield cavities form one row of shield cavities.

As shown in FIG. 4, specifically, the metal housing 10 includes a first housing 12, a second housing 13, and a metal sheet 14. The metal sheet 14 is located between the first housing 12 and the second housing 13. The metal sheet 14 and the first housing 12 form the first row of shield cavities 11*a*. The metal sheet 14 and the second housing 13 form the second row of shield cavities 11*b*. In this embodiment, the metal sheet 14 includes a first metal sheet 14*a* and a second metal sheet 14*b*, the first metal sheet 14*a* is connected to the first housing 12, the second metal sheet 14*b* is disposed on a side, of the first metal sheet 14*a*, that backs the first housing 12, and is connected to the second housing 13, the first row of shield cavities 11*a* is formed between the first metal sheet 14*a* and the first housing 12, and the second row of shield cavities 11*b* is formed between the second metal sheet 14*b* and the second housing 13. In this embodiment, a first electrical connecting part located in the first row of shield cavities 11*a* is electrically connected to the first housing 12, and a second electrical connecting part is electrically connected to the first metal sheet 14*a*; and a first electrical connecting part located in the second row of shield cavities 11*b* is electrically connected to the second housing 13, and a second electrical connecting part is electrically connected to the second metal sheet 14*b*.

It may be understood that, in this embodiment, there are two metal sheets, and the two metal sheets form the first row of shield cavities 11*a* and the second row of shield cavities 11*b* with the first housing 12 and the second housing 13 respectively, so that the two metal sheets (the first metal sheet 14*a* and the second metal sheet 14*b*) can be arranged in a staggered manner, thereby facilitating staggered arrangement of the two metal sheets (the first metal sheet 14*a* and the second metal sheet 14*b*), and further facilitating staggered arrangement of two rows of conducting pieces. In this embodiment, the first housing 12, the second housing 13, the first metal sheet 14*a*, and the second metal sheet 14*b* are fastened through connection, thereby facilitating assembly of the connector assembly 100.

Certainly, in a scenario of another embodiment, the first housing, the second housing, the first metal sheet, and the second metal sheet may be integrated. In another scenario of another embodiment, there may alternatively be only one metal sheet, and the metal sheet forms a first row of shield cavities with the first housing, and forms a second row of shield cavities with the second housing. Locations at which the first housing and the second housing are connected to the metal sheet may be set to make the first row of shield cavities and the second row of shield cavities arranged opposite to each other or in a staggered manner. In this scenario, the first housing, the second housing, and the metal sheet may be integrated, or may be fastened through connection. In still another scenario of another embodiment, the metal housing may alternatively include only a first housing and a second housing. The first housing and the second housing form one or more shield cavities. A first electrical connecting part is electrically connected to the first housing, and a second electrical connecting part is electrically connected to the second housing. In this scenario, the first housing and the second housing may be integrated, or may be fastened through connection, to facilitate assembly of the connector assembly.

Figure 8:
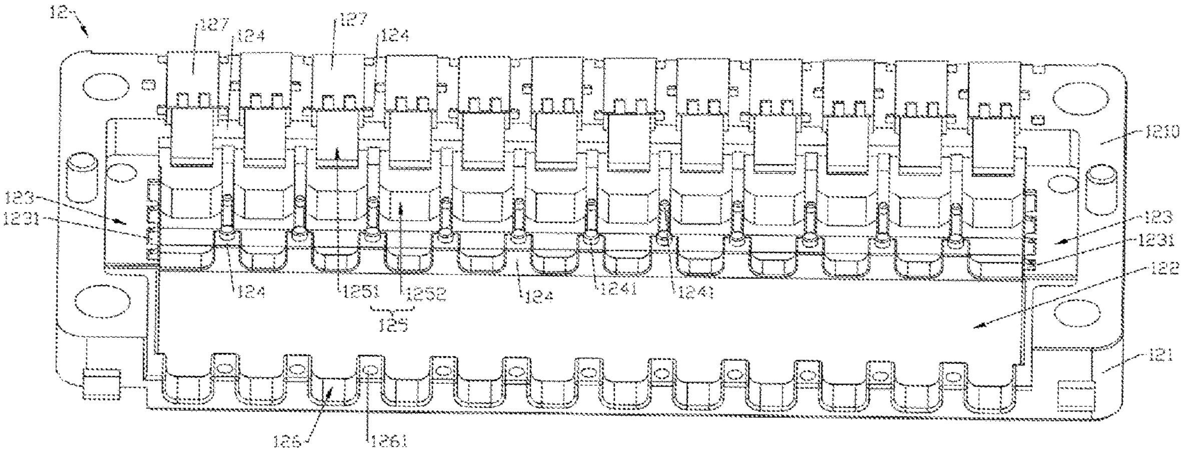
FIG. 8 is an example schematic diagram of a structure of a first housing of the connector assembly shown in FIG. 4.

Refer to FIG. 4 and FIG. 8. FIG. 8 is a schematic diagram of a structure of the first housing 12 of the connector assembly 100 shown in FIG. 4.

In this embodiment, the first housing 12 includes a first body 121, a groove 122, an accommodation groove 123, and a plurality of partition walls 124. The first body 121 includes a first mounting surface 1210. Both the groove 122 and the accommodation groove 123 are provided on the first mounting surface 1210, and the accommodation groove 123 is located in the middle on two sides of the groove 122 and is connected to the groove 122. The plurality of partition walls 124 are disposed in the groove 122 at spacings to form a plurality of first shield grooves 125, and the first metal sheet 14*a* covers an opening of the first shield groove 125 to form the first row of shield cavities 11*a* (FIG. 5). That is, a cavity wall of the first row of shield cavities 11*a* is formed by connecting the first metal sheet 14*a*, the partition walls 124, and a groove wall of the groove 122.

The second housing 13 covers the first housing 12, and two sides of the second housing 13 are fastened in the accommodation groove 123. That is, the accommodation groove 123 is configured to accommodate and connect the second housing 13. The accommodation groove 123 is located in the middle on the two sides of the groove 122, so that a part of the first shield groove 125 is exposed from the second housing 13. It may be understood that the second housing 13 does not cover a part of the first shield groove 125, so that the conducting piece 20 is exposed from the metal housing 10 through this part of the first shield groove 125, to be electrically connected to an external related device. Certainly, in another embodiment, the second housing may alternatively include an accommodation groove, and the first housing may cover the second housing and be fastened in the accommodation groove of the second housing.

The first housing 12 further includes a first wire trough 126. The first wire trough 126 penetrates a side wall, of the first housing 12, that faces the first shield groove 125. The first wire trough 126 is connected to the groove 122 and is in a one-to-one correspondence with the first shield groove 125. An end, of a wire 2 located in the first row of shield cavities 11*a*, that backs the first shield groove 125 extends out of the first housing 12 through the first wire trough 126. A fastening groove 1261 is provided on a side wall, of the first housing 12, that faces the first shield groove 125, and is configured to fasten the second housing 13.

The first housing 12 may be integrally molded by using a process such as die casting or metal injection molding. That is, the first body 121 and the plurality of partition walls 124 are integrated, thereby ensuring a connection structure between the first body 121 and the partition walls 124. Certainly, the partition walls 124 may alternatively be fastened to the first body 121 in another connection manner such as welding.

The first shield groove 125 includes a first part 1251 and a second part 1252 connected to the first part 1251. The first part 1251 is exposed from the second housing 13. A groove bottom wall of the first part 1251 gradually approaches the first mounting surface 1210 in a direction away from the second part 1252. A groove bottom wall of the second part 1252 is a groove bottom wall of the groove 122. That is, the groove bottom wall of the first part 1251 is inclined with respect to the groove bottom wall of the second part 1252, to fit shapes of the conducting piece 20 and the wire 2. Certainly, in another embodiment, the first part 1251 and the second part 1252 may alternatively be located on a same horizontal plane.

In this embodiment, the groove bottom wall of the accommodation groove 123 and a partition wall 124 located in the second part 1252 are located on a same horizontal plane, a limiting notch 1231 is provided in the accommodation groove 123, a fastening post 1241 is disposed on a surface, of the partition wall 124, that backs the groove bottom wall of the groove 122, the first metal sheet 14*a* covers an opening of the second part 1252, the first metal sheet 14*a* is limited by the fastening post 1241, and two sides of the first metal sheet 14*a* are limited in limiting notches 1231 of accommodation grooves 123 corresponding to the two sides. Certainly, in another embodiment, the first metal sheet 14*a* may alternatively cover the entire opening of the first shield groove 125.

The connector assembly 100 further includes a limiting block 127. A quantity of limiting blocks 127 corresponds to a quantity of first shield grooves 125. Each limiting block 127 is disposed in a first shield groove 125 corresponding to the limiting block, and is located at an end, of the first part 1251, that is away from the second part 1252. An end, of a conducting piece 20 located in the first row of shield cavities 11*a*, that is away from the wire 2 is disposed on the limiting block 127. Specifically, the limiting block 127 is made of an insulation material, and the end, of the conducting piece 20, that is away from the wire 2 may be partially embedded in a surface, of the limiting block 127, that backs the first shield groove 125, or may be disposed on the surface, of the limiting block 127, that backs the first shield groove 125. The limiting block 127 limits the conducting piece 20, to avoid deformation of the conducting piece 20 during use. In addition, the limiting block 127 can further prevent the conducting piece 20 from being electrically connected to the groove wall of the first shield groove 125, thereby improving service life of the connector assembly 100 and improving safety performance of the connector assembly 100.

Figure 9:
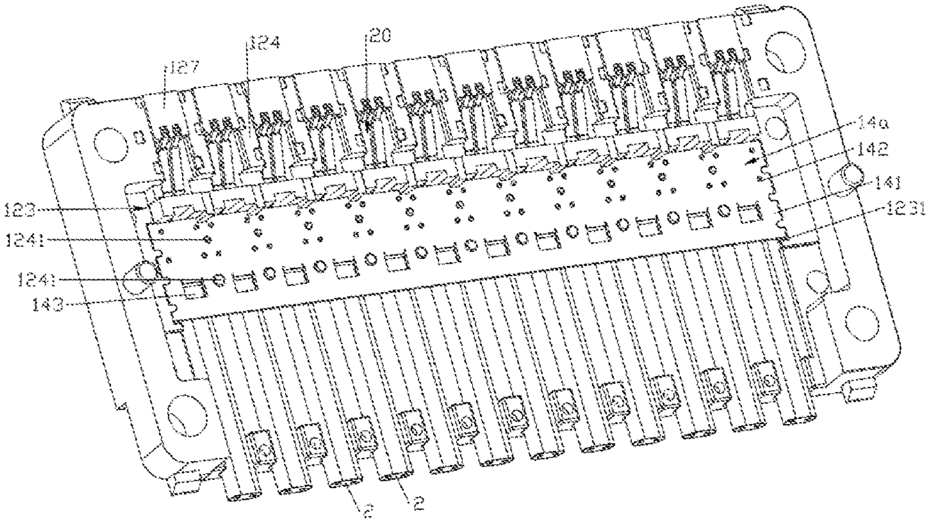
FIG. 9 is an example schematic diagram of a partial structure of the connector assembly shown in FIG. 4.

Refer to FIG. 3 and FIG. 9. FIG. 9 is a schematic diagram of a partial structure of the connector assembly 100 shown in FIG. 4.

The first metal sheet 14*a* includes a limiting structure 141, a via 142, and a conducting part 143. The limiting structure 141 is in a one-to-one correspondence with the limiting notch 1231, and the via 142 is in a one-to-one correspondence with the fastening post 1241. Limiting structures 141 are located on two opposite sides of the first metal sheet 14*a*. The via 142 penetrates two opposite surfaces of the first metal sheet 14*a*. The limiting structure 141 is configured to fit with a limiting notch 1231 corresponding to the limiting structure, and is clamped between the second housing 13 and the accommodation groove 123. The fastening post 1241 passes through a via 142 corresponding to the fastening post, to position and fasten the first metal sheet 14*a*. The conducting part 143 is disposed on a surface, of the first metal sheet 14*a*, that faces the first shield groove 125, and is configured to be electrically connected to the shield layer 2*a* of the wire 2. In this embodiment, the conducting part 143 is an elastomer. Because the elastomer is elastic, the first metal sheet 14*a* can be electrically connected to the wire 2, and the wire 2 can abut against the groove wall of the first shield groove 125, thereby ensuring a good electrical connection between the shield layer 2*a* of the wire 2 and the groove wall of the first shield groove 125, and effectively reducing crosstalk of the connector assembly 100. Certainly, in another embodiment, the first metal sheet 14*a* may alternatively be connected to the first housing 12 by using a screw or in another manner. Alternatively, the conducting part 143 may be a convex hull, and the convex hull abuts against the second electrical connecting part.

In this embodiment, the first metal sheet 14*a* is an integrated structure obtained through integral molding, to ensure connection strength of the first metal sheet 14*a*. Certainly, the conducting part 143 may alternatively be fastened to a surface of the first metal sheet 14*a* through bonding, clamping, or welding. In a scenario of another embodiment, the first metal sheet includes only a limiting structure and a via, and the first metal sheet may be electrically connected to the shield layer of the wire through welding or the like. In still another scenario of another embodiment, a conducting material may be further added between the first metal sheet and the shield layer of the wire, to implement an electrical connection between the first metal sheet and the shield layer of the wire.

Figure 10:
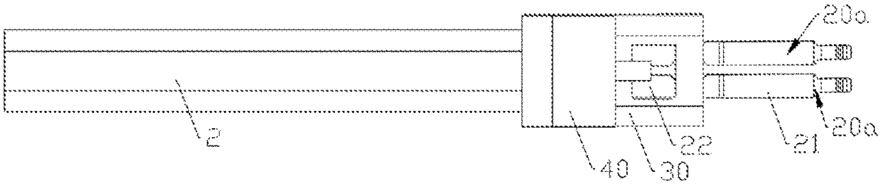
FIG. 10 is an example schematic diagram of a partial structure of the connector assembly shown in FIG. 4.

Refer to FIG. 9 and FIG. 10. FIG. 10 is a schematic diagram of a partial structure of the connector assembly 100 shown in FIG. 4.

The conducting piece 20 includes a contact part 21 and a connecting part 22 that are connected to each other. The connecting part 22 is electrically connected to the wire 2. A contact part 21 located in the first row of shield cavities 11*a* is located in the first part 1251 of the first shield groove 125. An end of the contact part 21 is embedded in a surface of the limiting block 127, to limit the contact part 21. The contact part 21 is exposed from a surface, of the second housing 13, that backs the first housing 12. That is, the contact part 21 is exposed from the second housing 13, so that the contact part 21 is electrically connected to an external related device. The connecting part 22 and a part of the wire 2 are located in the second part 1252. That is, the connecting part 22 of the conducting piece 20 and the part of the wire 2 connected to the conducting piece 20 are located in the shield cavity 11, thereby effectively reducing impact of crosstalk of the connector assembly 100, and supporting signal transmission at 112 Gbps and a higher rate.

In this embodiment, each conducting piece 20 includes two conducting terminals 20*a*, and correspondingly, each wire 2 includes two signal lines. The two conducting terminals 20*a* are respectively electrically connected to signal lines corresponding to the two conducting terminals. The two conducting terminals 20*a* are separately embedded in the limiting block 127 at a spacing, thereby effectively preventing an electrical connection between the two conducting terminals 20*a* during use. Certainly, in another embodiment, each conducting piece 20 may alternatively include more than two conducting terminals. In addition to a conducting terminal for transmitting a signal, a conducting terminal used for grounding may be further included. The conducting terminal used for grounding is electrically connected to the first housing, thereby further reducing impact of crosstalk of the connector assembly, and supporting signal transmission at 112 Gbps and a higher rate.

The connector assembly 100 further includes an insulator 30, and the insulator 30 is wrapped around a location at which the connecting part 22 of the conducting piece 20 is close to the contact part 21. Specifically, an insulator 30 is disposed at a location at which a connecting part 22 of each conducting piece 20 is close to a contact part 21, and the insulator 30 is wrapped around the conducting piece 20 to fasten two conducting terminals 20*a* of the conducting piece 20. In addition, the insulator 30 can further isolate the conducting piece 20 from the first shield groove 125, or isolate the conducting piece 20 from a cavity wall of the second row of shield cavities 11*b*, to prevent an electrical connection between the conducting piece 20 and the groove wall of the first shield groove 125 or the cavity wall of the second row of shield cavities 11*b*.

The insulator 30 may be further provided with a positioning pin 31. For example, a positioning pin 31 is disposed on a surface, of an insulator 30 located in the first row of shield cavities 11*a*, that faces the first metal sheet 14*a*, where the positioning pin 31 may penetrate and limit the first metal sheet 14*a*; and a positioning pin 31 is disposed on a surface, of an insulator 30 located in the second row of shield cavities 11*b*, that faces the second metal sheet 14*b*, where the positioning pin 31 may penetrate and limit the second metal sheet 14*b*.

As shown in FIG. 5 and FIG. 8, an end, of the wire 2 located in the first row of shield cavities 11*a*, that is away from the conducting piece 20 extends out of the first housing 12 through the first wire trough 126. A part, of the wire 2, that is located in the shield cavity 11 is embedded in the first shield groove 125, so that a first electrical connecting part, on the shield layer 2*a*, that faces the groove wall of the first shield groove 125 is attached to the groove wall. The conducting part 143 abuts against a second electrical connecting part, on the shield layer 2*a*, that backs the first shield groove 125.

It may be understood that, all peripheral surfaces of the shield layer 2*a* are electrically connected to peripheral walls, of the shield cavity 11, that the peripheral surfaces face. Therefore, when a signal returns from a peripheral wall of the shield cavity 11 to the wire 2, the signal on the peripheral wall of the shield cavity 11 is transmitted to a first electrical connecting part and a second electrical connecting part, on the shield layer 2*a*, that are close to the peripheral wall. A signal return path is shorter, and a loop inductance is small, thereby effectively reducing impact of crosstalk of the connector assembly 100, and supporting signal transmission at 112 Gbps and a higher rate.

In this embodiment, a shape of a first electrical connecting part, on the shield layer 2*a*, that faces the groove wall is the same as a shape of the groove wall, so that the first electrical connecting part, on the shield layer 2*a*, that faces the groove wall of the first shield groove 125 is closely attached to the groove wall of the first shield groove 125. In this way, a good electrical connection is implemented between first electrical connecting parts on three surfaces of the shield layer 2*a* and the groove wall of the first shield groove 125, thereby effectively reducing crosstalk of the connector assembly 100. Certainly, in another embodiment, the part, of the wire, that is located in the shield cavity is disposed in the first shield groove, but a conducting material is added between the shield layer and the groove wall of the first shield groove and between the shield layer and the first metal sheet, to implement an electrical connection between the shield cavity and the shield layer.

Figure 11:
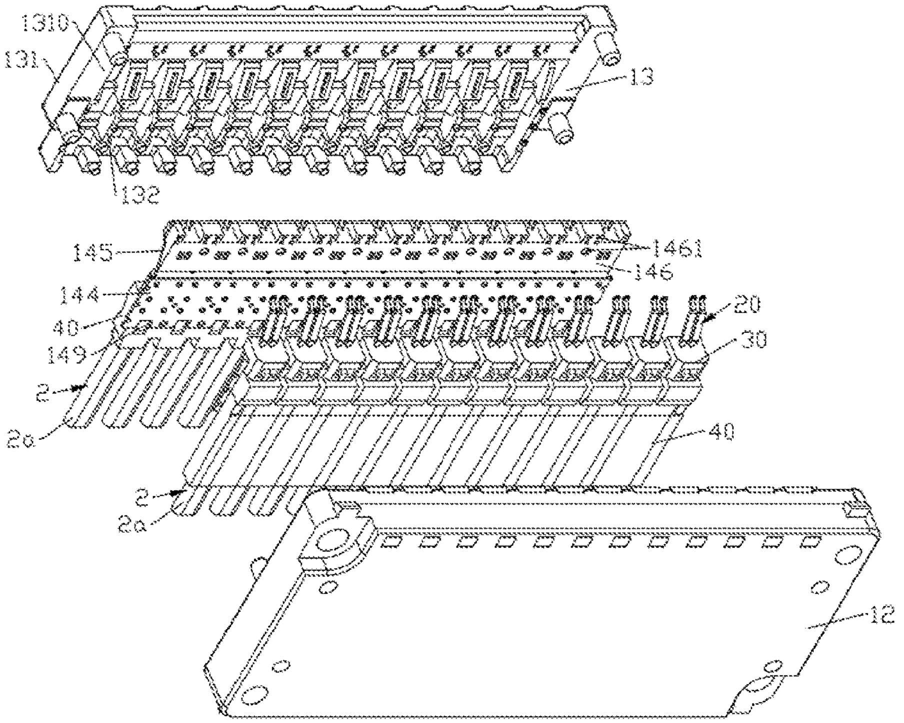
FIG. 11 is an example schematic exploded view of a structure of the connector assembly shown in FIG. 4.

Refer to FIG. 10 and FIG. 11. FIG. 11 is a schematic exploded view of a structure of the connector assembly 100 shown in FIG. 4.

The connector assembly 100 further includes a fastener 40. The fastener 40 is wrapped around a junction between the connecting part 22 and the wire 2, and fastens a wire 2 disposed in a same row of shield cavities 11. Specifically, there are two fasteners 40. One fastener 40 is wrapped around a junction between a connecting part 22 and a wire 2 in the first row of shield cavities 11*a*, and fastens all wires 2 located in the first row of shield cavities 11*a*. One fastener 40 is wrapped around a junction between a connecting part 22 and a wire 2 in the second row of shield cavities 11*b*, and fastens all wires 2 in the second row of shield cavities 11*b*. The fastener 40 can protect a solder joint between the conducting piece 20 and the wire 2. In addition, a plurality of conducting pieces 20 and a plurality of wires 2 that are located in a same row can be fastened by using the fastener 40 to form a transmission plate, so as to quickly assemble the connector assembly 100. This effectively improves production efficiency of the connector assembly 100, and reduces production costs of the connector assembly 100.

Figure 12:
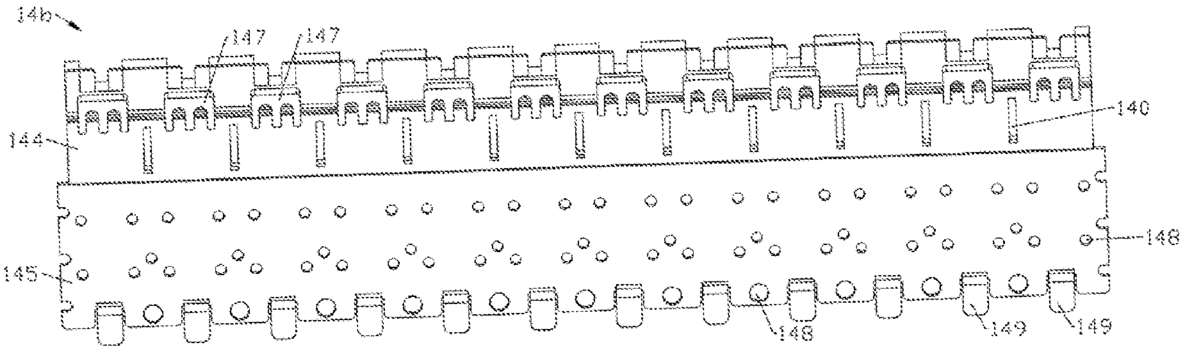
FIG. 12 is an example schematic diagram of a structure of a second metal sheet of the connector assembly shown in FIG. 11.

Refer to FIG. 4, FIG. 11, and FIG. 12. FIG. 12 is a schematic diagram of a structure of the second metal sheet 14*b* of the connector assembly 100 shown in FIG. 11.

The second metal sheet 14*b* includes a flat section 144 and a bent section 145 connected to the flat section 144. A support pad 146 is disposed on a surface, of the bent section 145, that faces the first metal sheet 14*a*. A surface, of the support pad 146, that faces the first metal sheet 14*a* is flush with a surface, of the flat section 144, that faces the first metal sheet 14*a*, so that the second metal sheet 14*b* can be disposed on the first metal sheet 14*a*. Specifically, a positioning groove 1461 is provided on a surface, of each of the support pad 146 and the flat section 144, that faces the first metal sheet 14*a*. The fastening post 1241 that passes through the via 142 of the first metal sheet 14*a* is accommodated in a positioning groove 1461 corresponding to the fastening post, thereby limiting the second metal sheet 14*b* on the first metal sheet 14*a*. In this embodiment, the support pad 146 is configured to support the bent section 145, and also increases an area of a connection between the second metal sheet 14*b* and the first metal sheet 14*a*, so that the second metal sheet 14*b* can be more stably limited on the first metal sheet 14*a*.

A limiting block 147 is disposed on a surface, of the bent section 145 of the second metal sheet 14*b*, that backs the support pad 146, and the limiting block 147 is located at an end, of the bent section 145, that is away from the flat section 144. A contact part 21 of a conducting piece 20 located in the second row of shield cavities 11*b* is located on a side, of the bent section 145, that backs the support pad 146. A connecting part 22 of the conducting piece 20 and a part of a wire 2 connected to the connecting part 22 are located on a side, of the flat section 144, that backs the first metal sheet 14*a*. An end, of the contact part 21, that is away from the connecting part 22 is disposed on the limiting block 147. Specifically, the limiting block 147 is made of an insulation material, and the end, of the contact part 21, that is away from the connecting part 22 may be partially embedded in a surface, of the limiting block 147, that backs the first shield groove 125, or may be disposed on a surface, of the limiting block 147, that backs the second metal sheet 14*b*. The limiting block 147 limits the conducting piece 20, to avoid deformation of the contact part 21 during use. In addition, the limiting block 147 can further prevent the contact part 21 from being electrically connected to the second metal sheet 14*b*, thereby improving service life of the connector assembly 100 and improving safety performance of the connector assembly 100.

The second metal sheet 14*b* further includes a via 148, a conducting part 149, and a clamping groove 140. The via 148 and the conducting part 149 are provided on the flat section 144 at a spacing. The conducting part 149 is disposed at a location that backs the surface of the first metal sheet 14*a*. The clamping groove 140 is provided on the bent section 145, and is configured to fit with the second housing 13. The positioning pin 31 of the insulator 30 disposed in the second row of shield cavities 11*b* is accommodated in the via 148 to position the transmission plate. The conducting part 149 is configured to be electrically connected to the shield layer 2*a* of the wire 2. The conducting part 149 may be an elastomer. Because the elastomer is elastic, the second metal sheet 14*b* can be electrically connected to the wire 2, and the wire 2 can abut against the second housing 13, thereby ensuring a good electrical connection between the shield layer 2*a* of the wire 2 and the second housing 13, and effectively reducing crosstalk of the connector assembly 100. In this embodiment, the second metal sheet 14*b* is an integrated structure obtained through integral molding, to ensure connection strength of the second metal sheet 14*b*. Certainly, the conducting part 149 may alternatively be fastened to a surface of the second metal sheet 14*b* through bonding, clamping, or welding. Alternatively, the conducting part 149 may be a convex hull, and the convex hull abuts against the second electrical connecting part.

Figure 13:
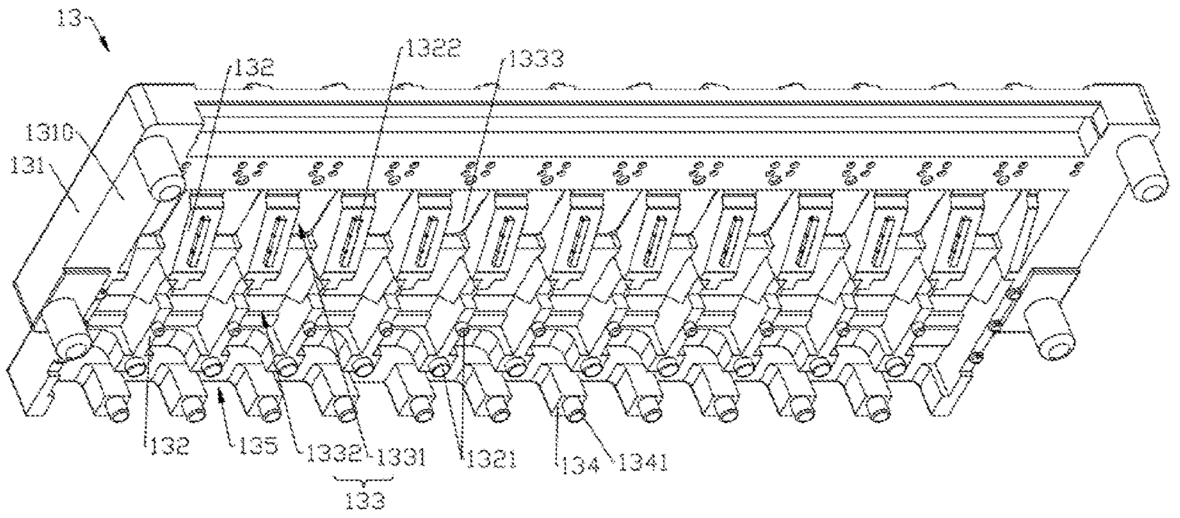
FIG. 13 is an example schematic diagram of a structure of a second housing of the connector assembly shown in FIG. 11.

Refer to FIG. 11 and FIG. 13. FIG. 13 is a schematic diagram of a structure of the second housing 13 of the connector assembly 100 shown in FIG. 11.

The second housing 13 includes a second body 131 and a plurality of partition plates 132. The second body 131 includes a second mounting surface 1310. The second mounting surface 1310 faces the first housing 12. The plurality of partition plates 132 are disposed at spacings on the second mounting surface 1310. That is, the plurality of partition plates 132 are disposed at spacings on a surface, of the second housing 13, that faces the first housing 12, and form a plurality of second shield grooves 133 with the second mounting surface 1310 (the surface, of the second housing 13, that faces the first housing 12). The second metal sheet 14*b* covers an opening of the second shield groove 133. That is, the second housing 13 is disposed on a side, of the second metal sheet 14*b*, that backs the first metal sheet 14*a*, to form the second row of shield cavities 11*b*.

The second housing 13 further includes a plurality of partition posts 134. The plurality of partition posts 134 are disposed at spacings at an edge, of the second mounting surface 1310, that faces the second shield grooves 133. The plurality of partition posts 134 and the second mounting surface 1310 form a plurality of second wire troughs 135. The second wire troughs 135 are in a one-to-one correspondence with the second shield grooves 133. An end, of the wire 2 located in the second row of shield cavities 11*b*, that backs the second shield groove 133 extends out of the second housing 13 through the second wire trough 135. A fastening protrusion 1341 is disposed on the partition post 134, and is fastened in a fastening groove 1261, of the first housing 12, that corresponds to the fastening protrusion 1341, so as to be fastened to the first housing 12. In this embodiment, the second wire trough 135 is connected to the first wire trough 126. Certainly, in another embodiment, the first wire trough 126 may alternatively not be connected to the second wire trough 135.

The second housing 13 may be integrally molded by using a process such as die casting or metal injection molding. That is, the second body 131, the plurality of partition plates 132, and the plurality of partition posts 134 are integrated, thereby ensuring a connection structure between the second body 131 and the partition plates 132. Certainly, the partition plates 132 and the partition posts 134 may alternatively be fastened to the second body 131 in another connection manner such as welding.

The second shield groove 133 includes a third part 1331 and a fourth part 1332 connected to the third part 1331. The contact part 21 of the conducting piece 20 located in the second row of shield cavities 11*b* is located in the third part 1331. The connecting part 22 of the conducting piece 20 and a part of the wire 2 connected to the connecting part 22 are located in the fourth part 1332. The third part 1331 is provided with an opening 1333, so that the contact part 21 of the conducting piece 20 is exposed from the second housing 13 through the opening 1333. A surface, of a partition plate 132 located in the third part 1331, that faces the first housing 12 is gradually away from the first housing 12 in a direction away from the fourth part 1332. That is, the surface, of the partition plate 132 located in the third part 1331, that faces the first housing 12 is an inclined surface, and a surface, of a partition plate 132 located in the fourth part 1332, that faces the first housing 12 is a flat surface. Therefore, the third part 1331 is correspondingly connected to the bent section 145 of the second metal sheet 14*b*, and the fourth part 1332 is correspondingly connected to the flat section 144 of the second metal sheet 14*b*.

In this embodiment, a fastening post 1321 and a convex bar 1322 are disposed on a surface, of the partition plate 132, that faces the second metal sheet 14*b*. The convex bar 1322 is located in the third part 1331, and the fastening post 1321 is located in the fourth part 1332. The convex bar 1322 is clamped in a clamping groove 140 (FIG. 12) corresponding to the convex bar, and the fastening post 1321 fits with the second metal sheet 14*b*, so that the second housing 13 is fastened to the second metal sheet 14*b*. In a scenario of another embodiment, the second metal sheet 14*b* may alternatively be connected to the second housing 13 by using a screw or in another manner.

A part, of the wire 2 located in the second row of shield cavities 11*b*, that is located in the shield cavity 11 is embedded in the second shield groove 133, so that a first electrical connecting part, on the shield layer 2*a*, that faces a groove wall of the second shield groove 133 is attached to the groove wall. The conducting part 149 of the second metal sheet 14*b* abuts against a second electrical connecting part, on the shield layer 2*a*, that backs the second shield groove 133. That is, the first electrical connecting part and the second electrical connecting part on the shield layer 2*a* are respectively electrically connected to peripheral walls, of the shield cavity 11, that the first electrical connecting part and the second electrical connecting part face. Therefore, when a signal returns from a peripheral wall of the shield cavity 11 to the wire 2, the signal on the peripheral wall of the shield cavity 11 is transmitted to a first electrical connecting part and a second electrical connecting part, on the shield layer 2*a*, that are close to the peripheral wall. A signal return path is shorter, and a loop inductance is small, thereby effectively reducing impact of crosstalk of the connector assembly 100, and supporting signal transmission at 112 Gbps and a higher rate.

In this embodiment, a shape of the first electrical connecting part, on the shield layer 2*a*, that faces the groove wall of the second shield groove 133 is the same as a shape of the groove wall of the second shield groove 133, so that the first electrical connecting part, on the shield layer 2*a*, that faces the groove wall of the second shield groove 133 is closely attached to the groove wall of the second shield groove 133. In this way, a good electrical connection is implemented between first connecting parts on three surfaces of the shield layer 2*a* and the groove wall of the second shield groove 133, thereby effectively reducing crosstalk of the connector assembly 100. Certainly, in another embodiment, the part, of the wire, that is located in the shield cavity is disposed in the second shield groove, but a conducting material is added between the shield layer and the groove wall of the second shield groove and between the shield layer and the second metal sheet, to implement an electrical connection between the shield cavity and the shield layer.

Figure 14:
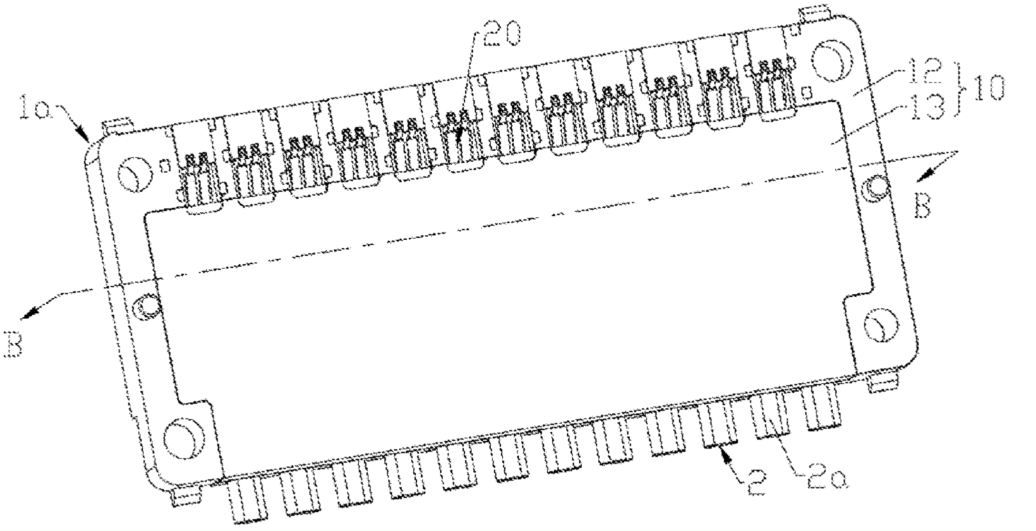
FIG. 14 is an example schematic diagram of a structure of a second embodiment of a connector assembly according to an embodiment.
Figure 15:
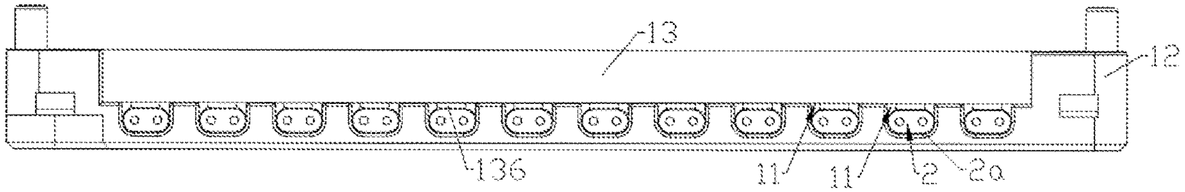
FIG. 15 is an example schematic cross-sectional view of a structure of the connector assembly shown in FIG. 14 in a B-B direction.

Refer to FIG. 14 and FIG. 15. FIG. 14 is a schematic diagram of a structure of a second embodiment of a connector assembly 100 according to this embodiment. FIG. 15 is a schematic cross-sectional view of a structure of the connector assembly 100 shown in FIG. 14 in a B-B direction.

This embodiment is approximately the same as the first embodiment. A difference lies in that the metal housing 10 in this embodiment includes a first housing 12 and a second housing 13, and the second housing 13 is buckled to the first housing 12 to form a shield cavity 11. The first housing 12 in this embodiment has a same structure as that of the first housing 12 in the first embodiment. The second housing 13 is a plate body, and the second housing 13 covers the first housing 12, and covers an opening of a first shield groove 125 (FIG. 8) to form a plurality of shield cavities 11. In this embodiment, the shield cavities 11 are arranged only in one row, and a cavity wall of each of the plurality of shield cavities 11 is formed by connecting the second housing 13, a partition wall 124, and a groove wall of a groove 122.

The second housing 13 covers the first housing 12, and two sides of the second housing 13 are fastened in an accommodation groove 123. That is, the accommodation groove 123 is configured to accommodate and connect the second housing 13. The second housing 13 does not cover a part of the first shield groove 125, so that a conducting piece 20 is exposed from the metal housing 10 through this part of the first shield groove 125, to be electrically connected to an external related device.

An end, of the wire 2, that is away from the conducting piece 20 extends out of the first housing 12 through a first wire trough. A part, of the wire 2, that is located in the shield cavity 11 is embedded in the first shield groove 125, so that a first electrical connecting part, on a shield layer 2*a*, that faces a groove wall of the first shield groove 125 is attached to the groove wall. A conducting part 136 may be disposed on a surface, of the second housing 13, that faces the first housing 12, and abut against a second electrical connecting part, on the shield layer 2*a*, that backs the first shield groove 125. The conducting part 136 may be an elastomer, or may be a convex structure such as a convex hull. That is, the first electrical connecting part and the second electrical connecting part on the shield layer 2*a* are respectively electrically connected to peripheral walls, of the shield cavity 11, that the first electrical connecting part and the second electrical connecting part face. Therefore, when a signal returns from a peripheral wall of the shield cavity 11 to the wire 2, the signal on the peripheral wall of the shield cavity 11 is transmitted to a first electrical connecting part and a second electrical connecting part, on the shield layer 2*a*, that are close to the peripheral wall. A signal return path is shorter, and a loop inductance is small, thereby effectively reducing impact of crosstalk of the connector assembly 100, and supporting signal transmission at 112 Gbps and a higher rate.

In this embodiment, a shape of a first electrical connecting part, on the shield layer 2*a*, that faces the groove wall is the same as a shape of the groove wall, so that the first electrical connecting part, on the shield layer 2*a*, that faces the groove wall of the first shield groove 125 is closely attached to the groove wall of the first shield groove 125. In this way, a good electrical connection is implemented between first electrical connecting parts on three surfaces of the shield layer 2*a* and the groove wall of the first shield groove 125, thereby effectively reducing crosstalk of the connector assembly 100. Certainly, in another embodiment, the part, of the wire, that is located in the shield cavity is disposed in the first shield groove, but a conducting material is added between the shield layer and the groove wall of the first shield groove and between the shield layer and the second housing, to implement an electrical connection between the shield cavity and the shield layer.

Figure 16:
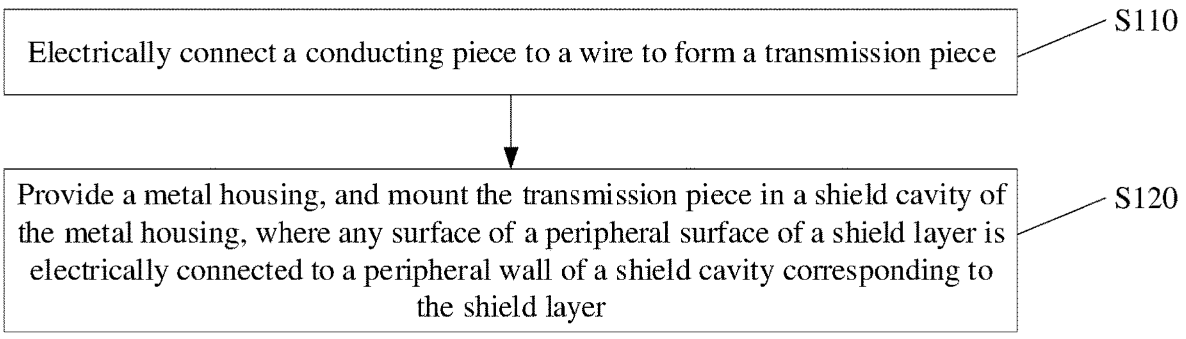
FIG. 16 is an example schematic flowchart of a manufacturing method for a connector assembly according to this application.

FIG. 16 is a schematic flowchart of a manufacturing method for a connector assembly 100 according to this application. The manufacturing method is used to manufacture the foregoing connector assembly 100, and the manufacturing method for the connector assembly 100 includes the following steps S110 and S120.

S110: Electrically connect a conducting piece 20 to a wire 2 to form a transmission piece 50, where a shield layer 2*a* is wrapped around the wire 2, at least two electrical connecting parts are disposed on an outer surface of the shield layer 2*a*, and the at least two electrical connecting parts face different directions.

Figure 17:
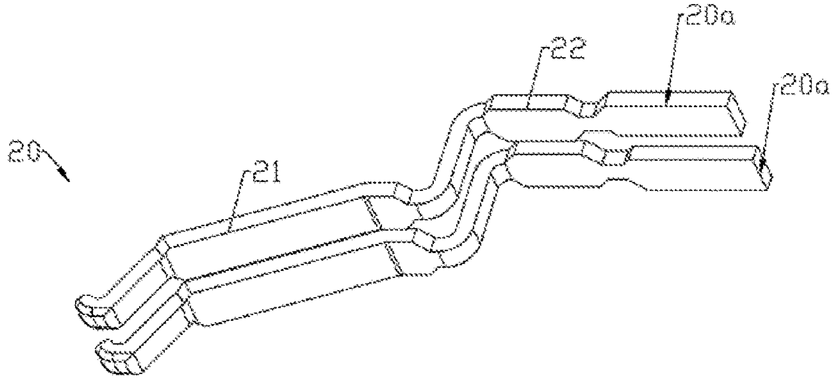
FIG. 17 to FIG. 24 are example flowcharts of a specific process of the manufacturing method for a connector assembly shown in FIG. 16.
Figure 18:
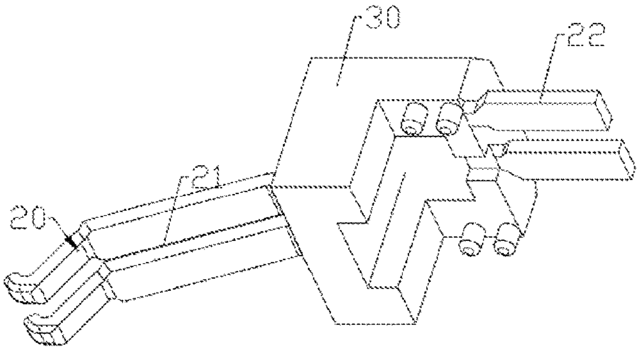

Specifically, as shown in FIG. 17, first, a plurality of conducting terminals 20*a* are provided, every two conducting terminals 20*a* form one conducting piece 20, and the conducting piece 20 includes a contact part 21 and a connecting part 22 that are connected to each other. Then the conducting piece 20 is stamped, so that the contact part 21 is bent relative to the connecting part 22. Then, as shown in FIG. 18, injection molding is performed on each conducting piece, to form, at a location at which the connecting part 22 of the conducting piece 20 is close to the contact part 21, an insulator 30 wrapped around the conducting piece 20. A material of the insulator 30 may be, for example, a plastic with good fluidity, such as a liquid crystal polymer (LCP). Two conducting terminals 20*a* are fastened at a spacing by using the insulator 30.

Figure 19:
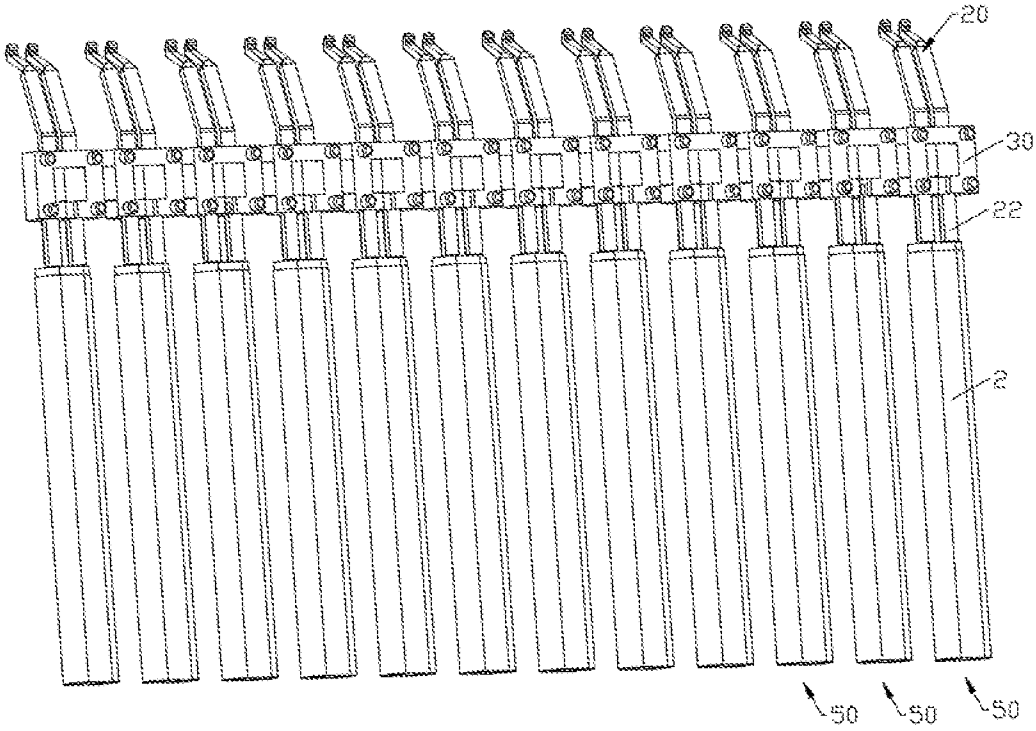

Then, as shown in FIG. 19, a plurality of wires 2 are provided, and shield layers 2*a* are wrapped around the wires 2. The shield layer 2*a* includes a first surface, a second surface, a third surface, and a fourth surface that face different directions and that are sequentially connected. It may be understood that the first surface, the second surface, the third surface, and the fourth surface are arranged in a circle to form a peripheral surface of the shield layer 2*a*. The at least two electrical connecting parts include a first electrical connecting part and a second electrical connecting part. The first electrical connecting part extends from the first surface to the third surface. The second electrical connecting part is located on the fourth surface. Each wire 2 is electrically connected to a conducting piece 20 corresponding to the wire. Specifically, a connecting part 22 of the conducting piece 20 is electrically connected to a signal line of the wire 2 to form a transmission piece 50.

Figure 20:
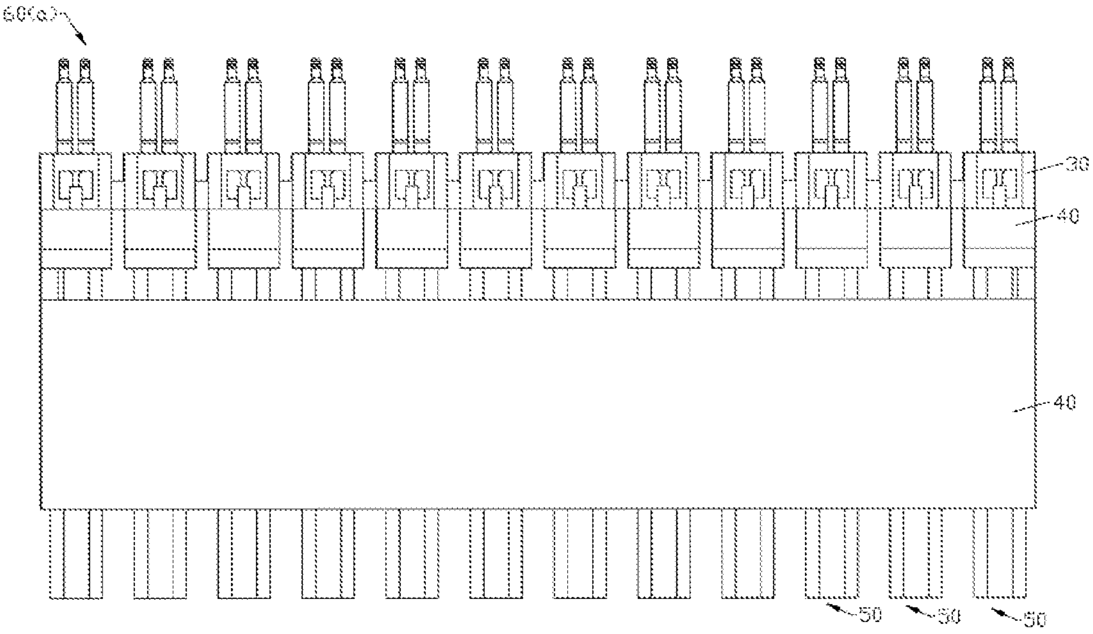
Figure 21:
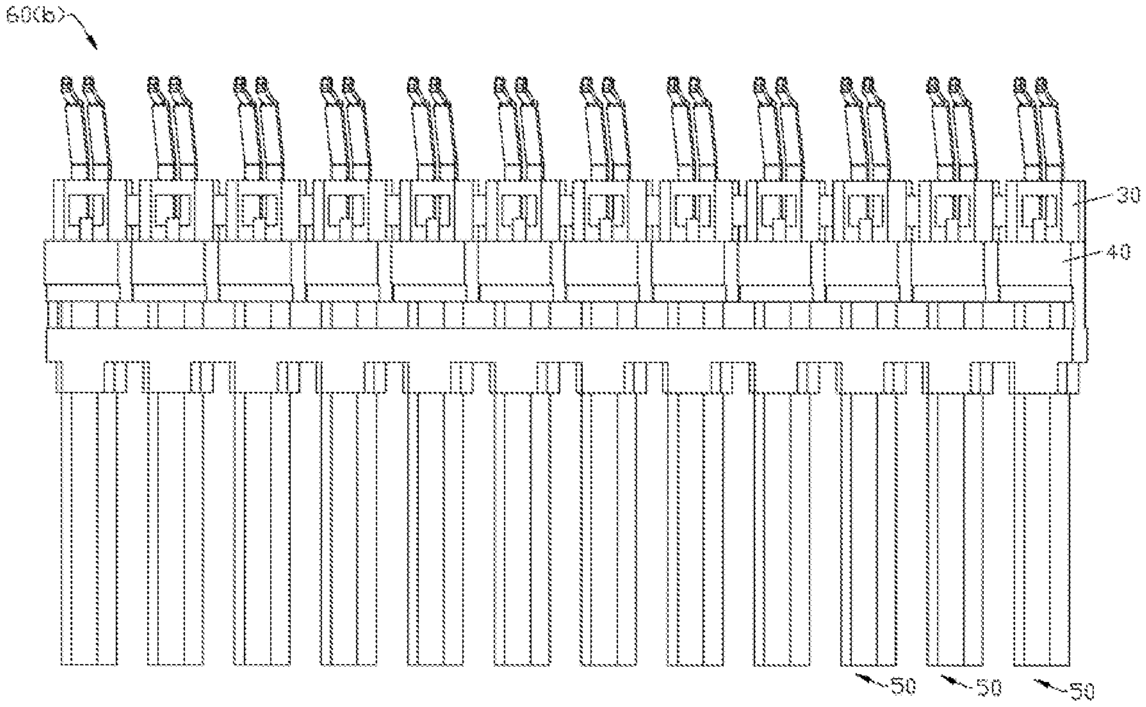

Finally, as shown in FIG. 20 and FIG. 21, a plurality of transmission pieces 50 are arranged in a row, and a fastener 40 wrapped around a junction between the conducting piece 20 and the wire 2 is formed through low-pressure injection molding, so that the plurality of transmission pieces 50 form a modular transmission plate 60. The fastener 40 is usually made of a low pressure adhesive such as polypropylene or polyethylene, to protect the junction between the conducting piece 20 and the wire 2 and fasten the plurality of transmission pieces 50.

In this embodiment, two rows of transmission plates 60 are formed. For ease of distinguishing, the two transmission plates 60 are a first transmission plate 60*a* and a second transmission plate 60*b*. Certainly, in another embodiment, one or more rows of transmission plates may alternatively be formed. Alternatively, the plurality of transmission pieces 50 may exist independently, that is, the plurality of transmission pieces 50 may not form a transmission plate through injection molding.

S120: Provide a metal housing 10, and mount the transmission piece 50 in a shield cavity of the metal housing 10, where the at least two electrical connecting parts are respectively electrically connected to parts, of the metal housing 10, that the at least two electrical connecting parts face.

Specifically, as shown in FIG. 8 and FIG. 13, the providing a metal housing 10 specifically includes: first, forming a first housing 12 and a second housing 13. In this embodiment, the first housing 12 and the second housing 13 each are integrally molded by using a process such as die casting or metal injection molding, to ensure connection strength of the first housing 12 and the second housing 13. Certainly, in another embodiment, the first housing 12 and the second housing 13 may alternatively be formed through assembly by using another process.

As shown in FIG. 8, the first housing 12 includes a first body 121, a groove 122, an accommodation groove 123, a plurality of partition walls 124, and a first wire trough 126. The first body 121 includes a first mounting surface 1210. Both the groove 122 and the accommodation groove 123 are provided on the first mounting surface 1210, and the accommodation groove 123 is located on two sides of the groove 122 and is connected to the groove 122. The plurality of partition walls 124 are disposed at spacings in the groove 122, to form a plurality of first shield grooves 125. The first wire trough 126 penetrates a side wall, of the first housing 12, that faces the first shield groove 125. The first wire trough 126 is connected to the groove 122 and is in a one-to-one correspondence with the first shield groove 125.

The first shield groove 125 includes a first part 1251 and a second part 1252 connected to the first part 1251. A groove bottom wall of the first part 1251 gradually approaches the first mounting surface 1210 in a direction away from the second part 1252. A groove bottom wall of the second part 1252 is a groove bottom wall of the groove 122. That is, the groove bottom wall of the first part 1251 is inclined with respect to the groove bottom wall of the second part 1252, to fit shapes of the conducting piece 20 and the wire 2.

In this embodiment, the groove bottom wall of the accommodation groove 123 and a partition wall 124 located in the second part 1252 are located on a same horizontal plane, a limiting notch 1231 is provided in the accommodation groove 123, and a fastening post 1241 is disposed on a surface, of the partition wall 124, that backs the groove bottom wall of the groove 122. An end, of a first part 1251 of each first shield groove 125, that is away from a second part 1252 is disposed on a limiting block 147, and the limiting block 147 is made of an insulation material.

As shown in FIG. 13, the second housing 13 includes a second body 131, a plurality of partition plates 132, and a plurality of partition posts 134. The second body 131 includes a second mounting surface 1310. The second mounting surface 1310 faces the first housing 12. The plurality of partition plates 132 are disposed at spacings on the second mounting surface 1310. That is, the plurality of partition plates 132 are disposed at spacings on a surface, of the second housing 13, that faces the first housing 12, and form a plurality of second shield grooves 133 with the second mounting surface 1310. The plurality of partition posts 134 are disposed at spacings at an edge, of the second mounting surface 1310, that faces the second shield grooves 133. The plurality of partition posts 134 and the second mounting surface 1310 form a plurality of second wire troughs 135. The second wire troughs 135 are in a one-to-one correspondence with the second shield grooves 133.

The second shield groove 133 includes a third part 1331 and a fourth part 1332 connected to the third part 1331. The third part 1331 is provided with an opening 1333. A surface, of a partition plate 132 located in the third part 1331, that faces the first housing 12 is gradually away from the first housing 12 in a direction away from the fourth part 1332. That is, the surface, of the partition plate 132 located in the third part 1331, that faces the first housing 12 is an inclined surface, and a surface, of a partition plate 132 located in the fourth part 1332, that faces the first housing 12 is a flat surface. In this embodiment, a fastening post 1321 and a convex bar 1322 are disposed on a surface, of the partition plate 132, that faces the second metal sheet 14*b*. The convex bar 1322 is located in the third part 1331, and the fastening post 1321 is located in the fourth part 1332.

Figure 22:
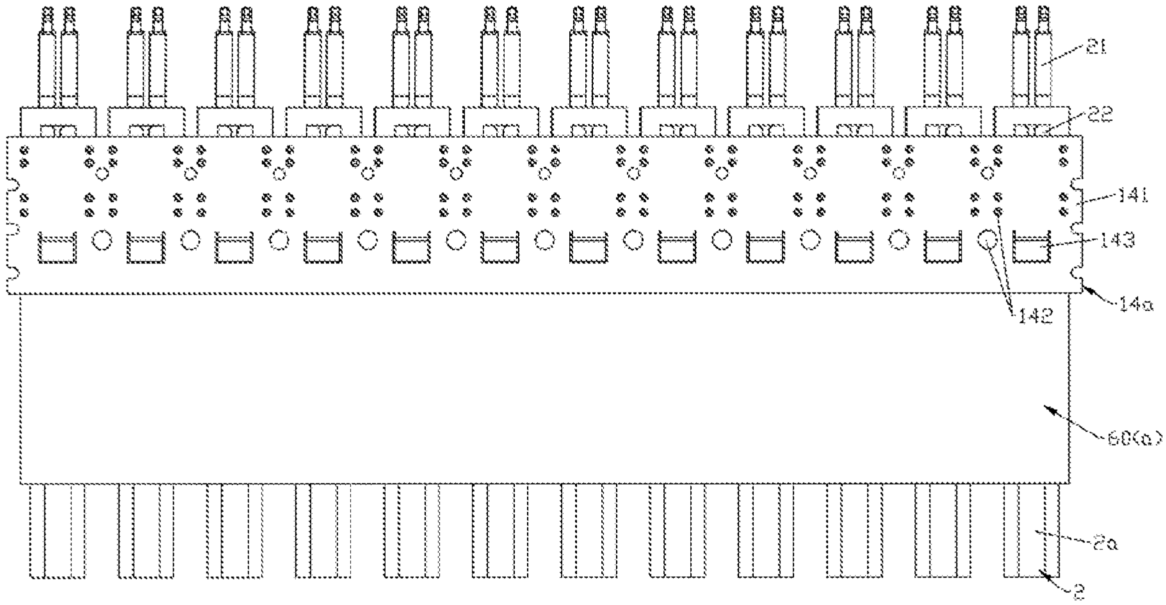

Then, as shown in FIG. 12 and FIG. 22, a metal sheet 14 is provided. The metal sheet 14 includes a first metal sheet 14*a* and a second metal sheet 14*b*. In this embodiment, the first metal sheet 14*a*, the second metal sheet 14*b*, the first housing 12, and the second housing 13 jointly constitute the metal housing. The first metal sheet 14*a* includes a limiting structure 141, a via 142, and a conducting part 143. The second metal sheet 14*b* includes a flat section 144 and a bent section 145 connected to the flat section 144. A support pad 146 is disposed on a surface, of the bent section 145, that backs the flat section 144. The support pad 146 is configured to support the bent section 145. A surface, of the support pad 146, that backs the bent section 145 is flush with a surface, of the flat section 144, that backs the bent section 145, so that the second metal sheet 14*b* can be disposed on the first metal sheet 14*a*. In this embodiment, the conducting part 143 is an elastomer. Certainly, the conducting part may alternatively be a convex structure such as a convex hull.

Specifically, a positioning groove is provided on a surface, of each of the support pad 146 and the flat section 144, that faces the first metal sheet 14*a*. A limiting block 147 is disposed on a surface, of the bent section 145 of the second metal sheet 14*b*, that backs the support pad 146. The limiting block 147 is made of an insulation material, and the limiting block 147 is located at an end, of the bent section 145, that is away from the flat section 144. The second metal sheet 14*b* further includes a via 148, a conducting part 149, and a clamping groove 140. The via 148 and the conducting part 149 are provided on the flat section 144 at a spacing. The clamping groove 140 is disposed on the bent section 145, and is configured to fit with the second housing 13. In this embodiment, the conducting part 149 is an elastomer. Certainly, the conducting part may alternatively be a convex structure such as a convex hull.

Figure 23:
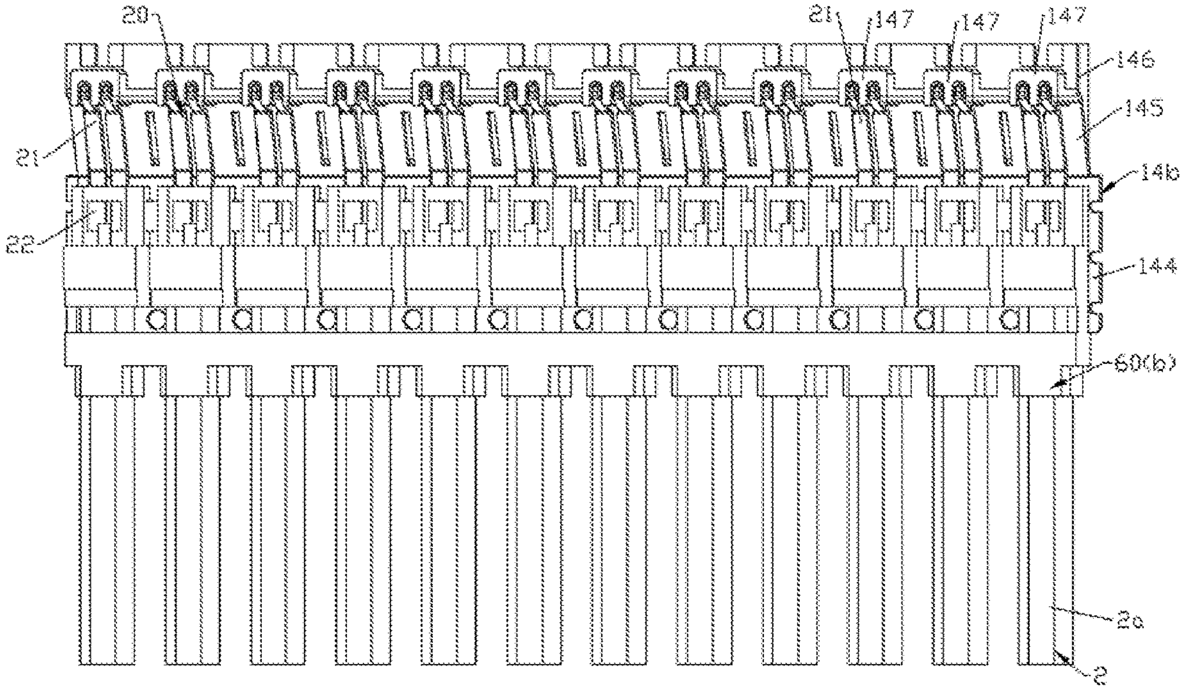

The mounting the transmission piece 50 in a shield cavity of the metal housing specifically includes: as shown in FIG. 22 and FIG. 23, first, mounting the first metal sheet 14*a* on the first transmission plate 60*a*, and mounting the second metal sheet 14*b* on the second transmission plate 60*b*. Specifically, the first metal sheet 14*a* is disposed on a surface in a bending direction of a contact part 21 of the first transmission plate 60*a*, the first metal sheet 14*a* is clamped with the first transmission plate 60*a*, the first metal sheet 14*a* covers the connecting part 22 of the conducting piece 20 and a part of the wire 2, and the conducting part 143 of the first metal sheet 14*a* abuts against and is electrically connected to the shield layer 2*a* on the outer surface of the wire 2.

In addition, the second metal sheet 14*b* is disposed on a surface that backs a bending direction of a contact part 21 of the second transmission plate 60*b*, the second metal sheet 14*b* is clamped with the second transmission plate 60*b*, the second metal sheet 14*b* covers the conducting piece 20 and a part of the wire 2, the conducting part 149 of the second metal sheet 14*b* abuts against and is electrically connected to the shield layer 2*a* on the outer surface of the wire 2, and an end, of the contact part 21 of the conducting piece 20 of the second transmission plate 60*b*, that is away from the connecting part 22 is disposed on the limiting block 147. The end, of the contact part 21, that is away from the connecting part 22 may be partially embedded in a surface, of the limiting block 147, that backs the first shield groove 125, or may be disposed on a surface, of the limiting block 147, that backs the second metal sheet 14*b*. The limiting block 147 limits the conducting piece 20, to avoid deformation of the contact part 21 during use. In addition, the limiting block 147 can further prevent the contact part 21 from being electrically connected to the second metal sheet 14*b*, thereby improving service life of the connector assembly and improving safety performance of the connector assembly.

In a scenario of another embodiment, alternatively, the first metal sheet and the second metal sheet may be respectively electrically connected to shield layers of wires of the first transmission plate and the second transmission plate by using a screw or in another manner. In another scenario in another embodiment, alternatively, the first metal sheet and the second metal sheet may be respectively electrically connected to the shield layers of the wires through welding. Alternatively, a conducting material may be added between the first metal sheet and a shield layer to implement an electrical connection between the first metal sheet and the shield layer corresponding to the first metal sheet, and a conducting material is added between the second metal sheet and a shield layer to implement an electrical connection between the second metal sheet and the shield layer corresponding to the second metal sheet.

Figure 24:
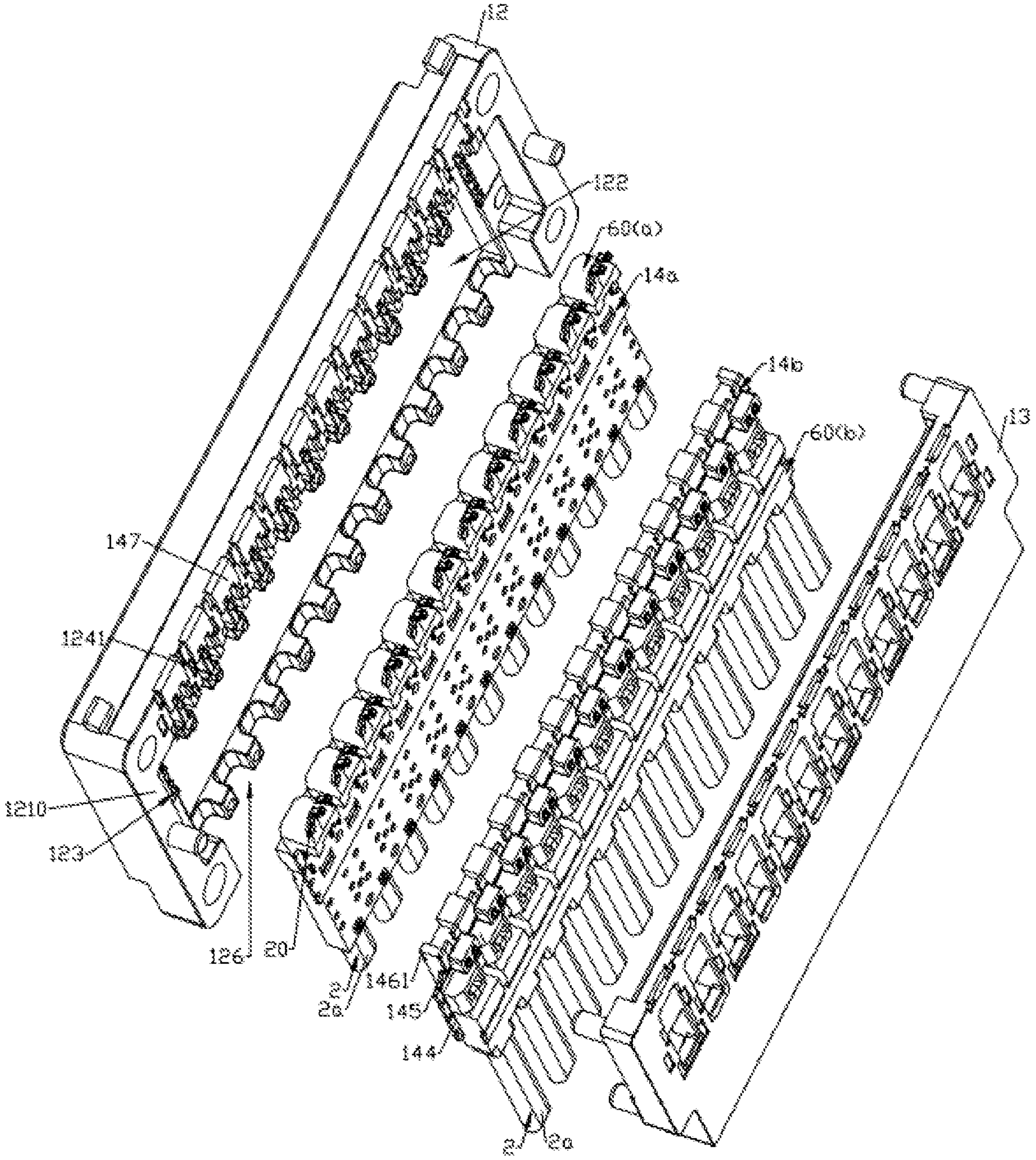

Then, as shown in FIG. 8 and FIG. 24, the first transmission plate 60*a*, on which the first metal sheet 14*a* is mounted, is mounted on the first housing 12. Specifically, the first transmission plate 60*a* is mounted in the groove 122 of the first housing 12 with a side, of the first transmission plate 60*a*, that backs the first metal sheet 14*a* facing the first housing 12, the conducting piece 20 of the first transmission plate 60*a* and a part of the wire 2 are disposed in the first shield groove 125, the contact part 21 of the conducting piece 20 is located in the first part 1251, an end, of the contact part 21, that is away from the connecting part 22 is disposed on the limiting block 147, and the connecting part 22 of the conducting piece 20 and a part of the wire 2 are located in the second part 1252. An end, of the wire 2, that is away from the conducting piece 20 extends out of the first housing 12 through the first wire trough 126.

In this embodiment, the end, of the contact part 21, that is away from the connecting part 22 may be partially embedded in a surface, of the limiting block 147, that backs the first shield groove 125, or may be disposed on a surface, of the limiting block 147, that backs the first shield groove 125. The limiting block 147 limits the conducting piece 20, to avoid deformation of the conducting piece 20 during use. In addition, the limiting block 147 can further prevent the conducting piece 20 from being electrically connected to a groove wall of the first shield groove 125, thereby improving service life of the connector assembly and improving safety performance of the connector assembly.

The first metal sheet 14*a* covers openings of second parts 1252 of the plurality of first shield grooves 125 of the first housing 12, and two sides of the first metal sheet 14*a* are limited in limiting notches 1231 of accommodation grooves 123 corresponding to the two sides. The fastening post 1241 on the partition wall 124 passes through the via 142 of the first metal sheet 14*a* to limit the first metal sheet 14*a*. The first metal sheet 14*a* and the second shield groove 133 form a plurality of shield cavities. A transmission piece 50 of the first transmission plate 60*a* is located in the shield cavity of the metal housing. A first electrical connecting part on a shield layer 2*a* of a wire 2 of the first transmission plate 60*a* is electrically connected to the first housing 12, and a second electrical connecting part is electrically connected to the first metal sheet 14*a*.

It may be understood that a part, of the wire 2, that is located in the shield cavity is embedded in the first shield groove 125, so that a first electrical connecting part, on the shield layer 2*a*, that faces the groove wall of the first shield groove 125 is attached to the groove wall. The conducting part 143 of the first metal sheet 14*a* abuts against a second electrical connecting part, on the shield layer 2*a*, that backs the first shield groove 125. Therefore, when a signal returns from a peripheral wall of the shield cavity to the wire 2, the signal on the peripheral wall of the shield cavity is transmitted to a first electrical connecting part and a second electrical connecting part, on the shield layer 2*a*, that are close to the peripheral wall. A signal return path is shorter, and a loop inductance is small, thereby effectively reducing impact of crosstalk of the connector assembly, and supporting signal transmission at 112 Gbps and a higher rate.

Then, as shown in FIG. 4 and FIG. 24, the second transmission plate 60*b*, on which the second metal sheet 14*b* is mounted, is mounted on a side, of the first metal sheet 14*a*, that backs the first housing 12. Specifically, a surface, of the second metal sheet 14*b*, that backs the second transmission plate 60*b* is arranged on the first metal sheet 14*a*, and a fastening post 1241 that penetrates the first metal sheet 14*a* is accommodated in a positioning groove 1461 corresponding to the fastening post, to limit the second metal sheet 14*b* on the first metal sheet 14*a*.

Finally, as shown in FIG. 13 and FIG. 24, the second housing 13 is mounted on the first housing 12 with the second mounting surface 1310 facing the first housing 12, to form the connector assembly 100 (FIG. 3). Specifically, each second shield groove 133 of the second housing 13 is wrapped around a conducting piece 20 and a part of a wire 2, on the second transmission plate 60*b*, that correspond to the second shield groove 133, and abuts against the second metal sheet 14*b*, to enclose a plurality of shield cavities with the second metal sheet 14*b*. An end, of the wire 2, that is away from the conducting piece 20 extends out of the second housing 13 through the second wire trough 135.

Specifically, the second housing 13 covers the first housing 12, and two sides of the second housing 13 are fastened in the accommodation groove 123. The second housing 13 may be fastened to the first housing 12 through clamping, screwing, or the like. A part of the first shield groove 125 is exposed from the second housing 13. It may be understood that the second housing 13 does not cover a part of the first shield groove 125, so that the conducting piece 20 located on the first transmission plate 60*a* is exposed from the metal housing 10 through this part of the first shield groove 125, to be electrically connected to an external related device.

The convex bar 1322 on the second housing 13 is clamped in a clamping groove 140, on the second metal sheet 14*b*, that corresponds to the convex bar. The fastening post 1321 of the second housing 13 passes through the via 148 of the second metal sheet 14*b*, to position the second housing 13 and the second metal sheet 14*b*, and fasten the second metal sheet 14*b* and the second housing 13. The contact part 21 of the conducting piece 20 is exposed from the second housing 13 through the opening 1333 of the second housing 13. The flat section 144 of the second metal sheet 14*b* covers the opening 1333 of the second shield groove 133. The transmission piece 50 of the second transmission plate 60*b* is located in the shield cavity of the metal housing 10. In addition, the first electrical connecting part on the shield layer 2*a* is electrically connected to the second housing 13, and the second electrical connecting part is electrically connected to the second metal sheet 14*b*.

It may be understood that a part, of the wire 2 of the second transmission plate 60*b*, that is located in the shield cavity is embedded in the second shield groove 133, so that a first electrical connecting part, on the shield layer 2*a*, that faces a groove wall of the second shield groove 133 is attached to the groove wall. The conducting part 149 of the second metal sheet 14*b* abuts against a second electrical connecting part, on the shield layer 2*a*, that backs the second shield groove 133. Therefore, when a signal returns from a peripheral wall of the shield cavity to the wire 2, the signal on the peripheral wall of the shield cavity is transmitted to a first electrical connecting part and a second electrical connecting part, on the shield layer 2*a*, that are close to the peripheral wall. A signal return path is shorter, and a loop inductance is small, thereby effectively reducing impact of crosstalk of the connector assembly 100, and supporting signal transmission at 112 Gbps and a higher rate.

In this embodiment, first, the first metal sheet 14*a* is mounted on the first transmission plate 60*a*, and the second metal sheet 14*b* is mounted on the second transmission plate 60*b*; and then the first metal sheet 14*a* and the second transmission plate 60*b* are mounted on the first housing 12, and the second metal sheet 14*b* and the second transmission plate 60*b* are mounted on the first housing 12. That is, in this embodiment, different elements of the connector assembly 100 are modularized and then assembled, thereby effectively improving assembly efficiency of the connector assembly 100, improving production efficiency of the connector assembly 100, and reducing production costs.

Certainly, in a scenario of another embodiment, the first metal sheet is not pre-mounted on the first transmission plate, and the second metal sheet is not pre-mounted on the second transmission plate. First, the first transmission plate is mounted on the first housing, and then the first metal sheet is disposed on a side, of the first transmission plate, that backs the first housing. Then the second metal sheet is disposed on a surface, of the first metal sheet, that backs the first transmission plate. Then the second transmission plate is disposed on a surface, of the second metal sheet, that backs the first metal sheet. Finally, the second housing is mounted on the first housing.

In another scenario of another embodiment, the providing a metal housing includes: forming a first housing and a second housing; providing a metal sheet; mounting the metal sheet on a first transmission plate; mounting, by facing the first housing, the first transmission plate on which the metal sheet is mounted; mounting a second transmission plate on a side, of the metal sheet, that backs the first transmission plate; and then mounting the second housing on the first housing, so that a transmission piece of the first transmission plate is disposed in a shield cavity formed by the first housing and the metal sheet, and a transmission piece of the second transmission plate is disposed in a shield cavity formed by the second housing and the metal sheet.

In still another scenario of another embodiment, the providing a metal housing includes: forming a first housing and a second housing; disposing a transmission piece or a transmission plate on the first housing; and buckling the second housing to the first housing, so that the transmission piece is mounted in a shield cavity formed by the first housing and the second housing, a first electrical connecting part is electrically connected to the first housing, and a second electrical connecting part is electrically connected to the second housing. It may be understood that one transmission piece corresponds to one independent shield cavity, and a quantity of transmission pieces is the same as a quantity of shield cavities.

In this application, the transmission piece 50 is first formed, and then the transmission piece 50 is mounted in the shield cavity of the metal housing 10, where the at least two electrical connecting parts are respectively electrically connected to the parts, of the metal housing 10, that the at least two electrical connecting parts face. That is, the at least two electrical connecting parts on the shield layer 2*a* that face different directions are respectively electrically connected to peripheral walls, of the shield cavity, that the at least two electrical connecting parts face. Therefore, when a signal returns from a peripheral wall of the shield cavity to the wire 2, the signal on the peripheral wall of the shield cavity is transmitted to an electrical connecting part, on the shield layer 2*a*, that is close to the peripheral wall. Compared with a case in which the peripheral wall of the shield cavity is electrically connected only to one electrical connecting part on the shield layer 2*a*, a signal return path is shorter, and a loop inductance is small, thereby effectively reducing impact of crosstalk of the connector assembly 100, and supporting signal transmission at 112 Gbps and a higher rate.

The foregoing descriptions are merely some embodiments and implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A connector assembly, comprising:
a metal housing;
a conducting piece;
a wire;
a shield layer, and
at least two shield cavities, wherein
the metal housing includes a shield cavity,
the conducting piece is accommodated in the shield cavity,
the wire is partially located in the shield cavity and is electrically connected to one end of the conducting piece,
the shield layer is wrapped around the wire,
at least two electrical connecting parts are disposed on an outer surface of the shield layer,
the at least two electrical connecting parts face different directions and are respectively electrically connected to parts, of the metal housing, that the at least two electrical connecting parts face,
the at least two shield cavities form at least a first row of shield cavities and a second row of shield cavities,
the metal housing includes a first housing, a second housing, and a metal sheet,
the metal sheet is located between the first housing and the second housing,
at least two electrical connecting parts located in the first row of shield cavities each are electrically connected to the first housing and the metal sheet that the at least two electrical connecting parts located in the first row of shield cavities face, and
at least two electrical connecting parts located in the second row of shield cavities each are electrically connected to the second housing and the metal sheet that the at least two electrical connecting parts located in the second row of shield cavities face.

2. The connector assembly according to claim 1, wherein the shield layer includes a first surface, a second surface, a third surface, and a fourth surface, wherein the first surface, the second surface, the third surface, and the fourth surface face different directions and are sequentially connected, a first electrical connecting part extends from the first surface to the third surface, and a second electrical connecting part is located on the fourth surface.

3. The connector assembly according to claim 1, wherein the second housing is buckled to the first housing to form the shield cavity, and the at least two electrical connecting parts are respectively electrically connected to the first housing and the second housing that the at least two electrical connecting parts face.

4. The connector assembly according to claim 3, wherein the conducting piece includes a contact part and a connecting part, wherein the contact part and the connecting part are connected to each other, the connecting part is electrically connected to the wire, and the contact part is exposed from a surface of the second housing backing the first housing.

5. The connector assembly according to claim 4, further comprising:

an insulator, wherein the insulator is wrapped around a location at which the connecting part is close to the contact part.

6. The connector assembly according to claim 1, wherein the metal sheet and the first housing form the first row of shield cavities, the metal sheet and the second housing form the second row of shield cavities, and each conducting piece and each wire correspond to one shield cavity.

7. The connector assembly according to claim 6, wherein the metal sheet includes a first metal sheet and a second metal sheet, the first metal sheet is connected to the first housing, the second metal sheet is disposed on a side, of the first metal sheet backing the first housing, and connected to the second housing, the first row of shield cavities is formed between the first metal sheet and the first housing, the second row of shield cavities is formed between the second metal sheet and the second housing, the at least two electrical connecting parts located in the first row of shield cavities each are electrically connected to the first housing and the first metal sheet that the at least two electrical connecting parts located in the first row of shield cavities face, and the at least two electrical connecting parts located in the second row of shield cavities each are electrically connected to the second housing and the second metal sheet that the at least two electrical connecting parts located in the second row of shield cavities face.

8. The connector assembly according to claim 7, wherein the first housing includes a groove and a plurality of partition walls, the plurality of partition walls are disposed in the groove at spacings arranged to form a plurality of first shield grooves, and the first metal sheet covers an opening of the first shield groove to form the first row of shield cavities.

9. The connector assembly according to claim 8, wherein a part of the wire located in the shield cavity is embedded in the first shield groove, so that an electrical connecting part, on the shield layer, facing a groove wall of the first shield groove is attached to the groove wall.

10. The connector assembly according to claim 9, wherein a shape of the electrical connecting part, on the shield layer, facing the groove wall is the same as a shape of the groove wall.

11. The connector assembly according to claim 8, wherein a conducting part is disposed on a surface of the first metal sheet facing the first shield groove, and the conducting part abuts against an electrical connecting part on the shield layer backing the first shield groove.

12. The connector assembly according to claim 11, further comprising:

a limiting block, wherein the limiting block is disposed in the first shield groove, and an end of a contact part is embedded in a surface of the limiting block thereby limiting the contact part.

13. The connector assembly according to claim 7, wherein the second housing includes a plurality of partition plates, the plurality of partition plates are disposed at spacings on a surface, of the second housing, facing the first housing, and form a plurality of second shield grooves with the surface, of the second housing, facing the first housing, and the second metal sheet covers an opening of the second shield groove to form the second row of shield cavities.

14. The connector assembly according to claim 7, further comprising:

a fastener, wherein the fastener is wrapped around a junction between a connecting part and the wire, and the fastener fastens a wire disposed in a same row of shield cavities.

15. An electronic device, comprising:

a circuit board; and a connector assembly, wherein the connector assembly comprises:

a metal housing;

a conducting piece;

a wire;

a shield layer; and at least two shield cavities, wherein the metal housing includes a shield cavity, the conducting piece is accommodated in the shield cavity, the wire is partially located in the shield cavity and is electrically connected to one end of the conducting piece, the shield layer is wrapped around the wire, at least two electrical connecting parts are disposed on an outer surface of the shield layer, the at least two electrical connecting parts face different directions and are respectively electrically connected to parts, of the metal housing, that the at least two electrical connecting parts face, the at least two shield cavities form at least a first row of shield cavities and a second row of shield cavities, the metal housing includes a first housing, a second housing, and a metal sheet, the metal sheet is located between the first housing and the second housing, at least two electrical connecting parts located in the first row of shield cavities each are electrically connected to the first housing and the metal sheet that the at least two electrical connecting parts located in the first row of shield cavities face, and at least two electrical connecting parts located in the second row of shield cavities each are electrically connected to the second housing and the metal sheet that the at least two electrical connecting pa located in the second row of shield cavities face, wherein the connector assembly is connected between the circuit board and another device, or the connector assembly is connected between two elements of the circuit board.

16. The electronic device according to claim 15, wherein the metal sheet and the first housing form the first row of shield cavities, the metal sheet and the second housing form the second row of shield cavities, and each conducting piece and each wire correspond to one shield cavity.

17. The electronic device according to claim 16, wherein the metal sheet includes a first metal sheet and a second metal sheet, the first metal sheet is connected to the first housing, the second metal sheet is disposed on a side, of the first metal sheet backing the first housing, and connected to the second housing, the first row of shield cavities is formed between the first metal sheet and the first housing, the second row of shield cavities is formed between the second metal sheet and the second housing, the at least two electrical connecting parts located in the first row of shield cavities each are electrically connected to the first housing and the first metal sheet that the at least two electrical connecting parts located in the first row of shield cavities face, and the at least two electrical connecting parts located in the second row of shield cavities each are electrically connected to the second housing and the second metal sheet that the at least two electrical connecting parts located in the second row of shield cavities face.

18. A manufacturing method for a connector assembly, comprising:

electrically connecting a conducting piece to a wire to form a transmission piece, wherein a shield layer is wrapped around the wire, at least two electrical connecting parts are disposed on an outer surface of the shield layer, and the at least two electrical connecting parts face different directions;

disposing a plurality of transmission pieces in a row to form a first transmission plate and a second transmission plate;

providing a metal housing by:

forming a first housing and a second housing;

providing a metal sheet including a first metal sheet and a second metal sheet;

mounting the first metal sheet on the first transmission plate; and mounting the second metal sheet on the second transmission plate; and mounting the transmission piece in a shield cavity of the metal housing by:

making the first transmission plate on which the first metal sheet is mounted face the first housing;

mounting the second transmission plate on which the second metal sheet is mounted on a side of the first metal sheet backing the first housing, and mounting the second housing on the first housing, so that a transmission piece of the first transmission plate is disposed in a shield cavity formed by the first housing and the first metal sheet, wherein the at least two electrical connecting parts are respectively electrically connected to parts of the metal housing that the at least two electrical connecting parts face, at least two electrical connecting parts located in a first row of shield cavities each are electrically connected to the first housing and the first metal sheet that the at least two electrical connecting parts located in the first row of shield cavities face, and at least two electrical connecting parts located in a second row of shield cavities each are electrically connected to the second housing and the second metal sheet that the at least two electrical connecting parts located in the second row of shield cavities face.

19. The manufacturing method according to claim 18, wherein mounting the transmission piece in the shield cavity of the metal housing comprises:

buckling the second housing to the first housing, so that the transmission piece is mounted in the shield cavity formed by the first housing and the second housing, wherein the at least two electrical connecting parts are respectively electrically connected to the first housing and the second housing that the at least two electrical connecting parts face.

20. The manufacturing method according to claim 18, wherein a transmission piece of the second transmission plate is disposed in a shield cavity formed by the second housing and the second metal sheet.

* * * * *